US012138634B2

(12) United States Patent
Gray et al.

(10) Patent No.: US 12,138,634 B2
(45) Date of Patent: Nov. 12, 2024

(54) MILL LINER, COUPLING TOOL AND METHOD OF REMOVAL OF A MILL LINER

(71) Applicant: Bradken Resources Pty Limited, Mayfield West (AU)

(72) Inventors: Michael Stewart Gray, Toukley (AU); David Joel Stewart, Maryland (AU); Terry Alexander Shore, Ulverstone (AU)

(73) Assignee: Bradken Resources Pty Limited, Mayfield West (AU)

(*) Notice: Subject to any disclaimer, the term of this patent is extended or adjusted under 35 U.S.C. 154(b) by 760 days.

(21) Appl. No.: 17/268,921

(22) PCT Filed: Aug. 16, 2019

(86) PCT No.: PCT/AU2019/050864
§ 371 (c)(1),
(2) Date: Feb. 16, 2021

(87) PCT Pub. No.: WO2020/034012
PCT Pub. Date: Feb. 20, 2020

(65) Prior Publication Data

US 2023/0356234 A1 Nov. 9, 2023

(30) Foreign Application Priority Data

Aug. 16, 2018 (AU) ................................ 2018903011

(51) Int. Cl.
*B02C 17/22* (2006.01)
*B02C 17/00* (2006.01)
*B02C 17/10* (2006.01)

(52) U.S. Cl.
CPC .................................... *B02C 17/22* (2013.01)

(58) Field of Classification Search
CPC ............................ B02C 17/22; B02C 17/1825
See application file for complete search history.

(56) References Cited

U.S. PATENT DOCUMENTS 2,114,640 A * 4/1938 Rumbarger ............. B02C 17/22 241/182
4,394,982 A * 7/1983 Wilson .................... B02C 17/22 241/300

(Continued)

FOREIGN PATENT DOCUMENTS

AU 2005239667 A1 6/2006
CN 105562170 B 11/2017

(Continued)

OTHER PUBLICATIONS

International Search Report and Written Opinion dated Dec. 9, 2019, directed to International Application No. PCT/AU2019/050864; 21 pages.

*Primary Examiner* — Mohammed S. Alawadi
(74) *Attorney, Agent, or Firm* — Morrison & Foerster LLP

(57) ABSTRACT

Disclosed is a mill liner for a grinding mill, a mill liner coupling, a coupling tool, and a method of removing a mill liner for a grinding mill. The mill liner is arranged to be removably mounted to an interior surface of the grinding mill. The mill liner includes a coupling component that forms part of a coupling to connect the liner to a coupling tool for lifting of the liner. The coupling component being may be accessible via the inner surface or the wear surface. The coupling component may be in the form of at least one cavity.

22 Claims, 40 Drawing Sheets

(56) References Cited

U.S. PATENT DOCUMENTS

| | | | | |
|---|---|---|---|---|
| 5,832,583 | A | 11/1998 | Wason | |
| 5,950,944 | A * | 9/1999 | Larsen | B02C 17/22 241/300 |
| 6,082,646 | A | 7/2000 | Clarke et al. | |
| 8,919,522 | B2 | 12/2014 | Cieplak et al. | |
| 2010/0084244 | A1 | 4/2010 | Pittman | |
| 2013/0140387 | A1 * | 6/2013 | Fernandez | B02C 17/22 241/300 |
| 2022/0307538 | A1 * | 9/2022 | Molesworth | B65G 11/166 |

FOREIGN PATENT DOCUMENTS

| | | | |
|---|---|---|---|
| WO | 2012/079123 | A2 | 6/2012 |
| WO | 2013/036194 | A1 | 3/2013 |
| WO | 2018/112524 | A1 | 6/2018 |
| WO | 2018/157201 | A1 | 9/2018 |

* cited by examiner

SECTION M-M

MILL LINER, COUPLING TOOL AND METHOD OF REMOVAL OF A MILL LINER

CROSS-REFERENCE TO RELATED APPLICATIONS

This application is a national stage application under 35 USC 371 of International Application No. PCT/AU2019/050864, filed Aug. 16, 2019, which claims the priority of Australian Application No. 2018903011, filed Aug. 16, 2018, the entire contents of each of which are incorporated herein by reference.

FIELD OF THE DISCLOSURE

The present disclosure relates to a mill liner for a grinding mill, a mill liner coupling, a coupling tool, and a method of replacing a mill liner for a grinding mill.

BACKGROUND OF THE DISCLOSURE

Grinding mill liners for semi-autogenous mills (SAG), autogenous mills (AG), rod, and ball mills are replaceable wear parts that extend the life of the mill. Grinding mill liners are fastened to a cylindrical interior surface of the grinding mill. In order to install or remove the mill liners from the grinding mill, an operator is required inside the mill which is a harsh and hazardous environment. Due to the shape of the grinding mills, the operators are often required to climb inside of the mill to remove or install liners. Further, slings or chains may be used to assist with the installation and removal process but require the operators to be inside the grinding mill to attach and release the slings or chains to the mill liners.

It is to be understood that, if any prior art is referred to herein, such reference does not constitute an admission that the prior art forms a part of the common general knowledge in the art, in Australia or any other country.

SUMMARY OF THE DISCLOSURE

Disclosed is a mill liner for a grinding mill, the liner comprising a wear surface and an opposite inner surface, a fixing arrangement for use in mounting the liner to an interior surface of the grinding mill wherein in use the mill liner is arranged to be removably mounted to the interior surface via the fixing arrangement with the inner surface in opposed relation to the interior surface, wherein the mill liner further comprises a coupling component that forms part of a coupling to connect the liner to a coupling tool for lifting of the liner, the coupling component being accessible to the coupling tool via the inner surface.

Advantageously, the coupling component may be co-operable with the coupling tool for lifting the mill liner that is operable without manual intervention of the operator. It is understood that the mill liner may not be required to be mounted directly to the interior surface of the grinding mill, and may be mounted indirectly to the interior surface of the grinding mill via another liner.

An advantage of accessing the coupling component from the inner surface is that the coupling component may be protected whilst the liner is in operation which would not be the case if the coupling component was accessible from the wear surface. Also, when liners are removed from the interior surface (in a process referred to as "knocking in"), they often land wear surface face down. In such positions, the coupling components are therefore readily accessible as the inner surface is facing up.

In some forms, the coupling component comprises at least one cavity formed in the mill liner. In some forms, the at least one cavity opens to the inner surface. In some forms, the at least one cavity is shaped to capture a complementary projection disposed on the coupling tool. In this way, the coupling does not require actuation from the operator, and instead, the projection is slid into the cavity. Such positioning of the components may be achieved by remote operation of the coupling tool. In alternative embodiments, the coupling may be in the form of a lug or a projection defined on or in the mill liner and the cavity may be defined on the coupling tool. In further alternative embodiments, the coupling may be in the form of an actuated locking system such a through a cam arrangement. The cam arrangement may be remotely actuated (by an operator or automatically) to alter the shape, position, and/or orientation of the coupling. Upon actuation the coupling interlocks with the cavity and may be remotely actuated to release the coupling. For example, the cam arrangement may include the at least one cavity having include a cam surface, and the coupling tool having a follower. The cam arrangement may be biased into a coupled or a locked position. It is understood the alternative embodiment including the cam arrangement may be in any suitable form and may require actuation from the operator.

In some forms, the opening of the at least one cavity is generally T-shaped. It is understood the at least one cavity may be any suitable shape such as C-shaped, D-shaped, G-shaped, U-shaped, V-shaped, W-shaped, diamond-shaped etc. provided the cavity is suitable for capturing the projection.

In some forms, the cavity includes a re-entrant portion behind which the tool may engage in a locked position.

In some forms, the coupling component is spaced from the centre of gravity of the liner such that on lifting of the liner through the coupling component, the liner is biased to move to a position under gravity that locks the coupling. In some forms, the liner is able to move to a position under a force that unlocks the coupling. In some forms, the liner is able to move to both the locking and unlocking position under sole operation of a mill liner replacement machine.

Disclosed is a mill liner for a grinding mill, the liner comprising a wear surface and an opposite inner surface, a fixing arrangement for use in mounting the liner to an interior surface of the grinding mill wherein in use the mill liner is arranged to be removably mounted to the interior surface via the fixing arrangement with the inner surface in opposed relation to the interior surface, wherein the mill liner further comprises a coupling component that forms part of a coupling to connect the liner to a coupling tool for lifting of the liner, the coupling component comprising at least one cavity formed in the mill liner and being accessible to the coupling tool via the inner surface.

In one form, the at least one cavity is accessible via the wear surface and/or the inner surface.

Advantageously, the at least one cavity being accessible via the wear surface and/or the inner surface provides flexibility. In this way, the mill liner may be retrieved from the grinding mill from any direction and one of the wear surface or the inner surface is not required to be accessible to the coupling tool for lifting the mill liner.

In some forms, the at least one cavity is accessible via the inner surface. In some forms, the at least one cavity opens to the inner surface. In some forms, the at least one cavity is shaped to capture a complementary projection disposed on the coupling tool. In some forms, the opening of the at least one cavity is generally T-shaped. In some forms, the coupling component is spaced from the centre of gravity of the liner such that on lifting of the liner through the coupling component, the liner is biased to move to a position under gravity that locks the coupling. As discussed above, the at least one cavity includes all the same advantages and all the same alternative forms.

Disclosed is a mill liner for a grinding mill, the liner comprising a wear surface and an opposite inner surface, a fixing arrangement for use in mounting the liner to an interior surface of the grinding mill wherein in use the mill liner is arranged to be removably mounted to the interior surface via the fixing arrangement with the inner surface in opposed relation to the interior surface, wherein the mill liner further comprises a coupling component that forms part of a coupling to connect the liner to a coupling tool for lifting of the liner, the coupling component being disposed within the liner and is arranged to become accessible to the coupling tool on wear of the wear surface. Advantageously, this embodiment of the mill liner may indicate degree of wear to the operator, and thus it may be easily identifiable when the mill liner needs to be replaced.

In some forms, the coupling component comprises at least one cavity formed in the mill liner. In some forms, the at least one cavity is shaped to capture a complementary projection disposed on the coupling tool. In some forms, the fixing arrangement comprises at least one through hole to receive mechanical fasteners to secure the mill liner to the interior surface of the grinding mill. In some forms, the mill liner is formed as a metal casting. In some forms, the mill liner may be formed of composite material such as fabricated metal, fabricated metal with a mixture of steel/iron and rubber, and rubber and metal.

In some forms, one or more plugs are provided that are configured to inhibit the ingress of mill fines into the coupling component.

In some forms, the mill liner further comprising a wear indicator to indicate wear of the liner. In some forms, the wear indicator is associated with the coupling component.

In a further aspect, there is disclosed a mill liner for a grinding mill, the liner comprising a wear surface and an opposite inner surface, a coupling component that forms part of a coupling to connect the liner to a coupling tool for lifting of the liner, and a wear indicator to indicate wear of the component, the wear indicator being associated with the coupling component.

Disclosed is a mill liner coupling comprising a coupling component disposed in or on a mill liner is as otherwise described above and a coupling tool adapted to be releasably mounted on a working arm of a liner placement machine, the coupling being configured to allow for coupling of the mill liner to the working arm under operation of the machine without manual intervention at the coupling. Advantageously, the coupling may be arranged to operate in a number of different applications and is not limited to a specific type of mill liner. The coupling may also be retrofit to existing mill liner machines.

In some forms, the coupling comprises at least one inter-fitting projection and recess, one of the projection or recess comprising the coupling component, the other of the projection or recess comprising an engagement portion of the coupling tool.

In some forms, the projection includes a stem and an enlarged head which is arranged to be captured in the recess of the coupling to secure the coupling.

In some forms, the coupling tool includes a mounting portion that is arranged to mount the tool to the working arm, the mounting portion being arranged to be mounted to a grapple of the working arm.

In some forms, the coupling tool further comprises a stabilising portion that is operative to bear against the mill liner. In some forms, the stabilising portion comprises a reaction foot that is arranged to extend between the mill liner and the machine.

Disclosed is a method for removal of a mill liner from a grinding mill, the mill liner comprising a wear surface and an opposite inner surface, in use the mill liner is arranged to be removably mounted to the interior surface with the inner surface of the mill liner in opposed relation with an interior surface of the grinding mill, the method comprising: removing liner from the interior surface of the grinding mill; and coupling a coupling tool for lifting the mill liner to a coupling component of the inner surface of the mill liner and accessible to the coupling tool via the inner surface. Advantageously, the method disclosed herein allows the removal of the mill liner without manual intervention of the operator.

In some forms, the coupling component comprises at least one cavity formed in the mill liner. In some forms, the at least one cavity opens to the inner surface.

In some forms, the coupling tool comprises a projection that is a complementary shape to the at least one cavity and the method further comprises capturing the projection in the at least one cavity during coupling of the coupling tool and the mill liner. In some forms, the coupling component is spaced from the centre of gravity of the mill liner, and the method further comprises lifting of the mill liner through the coupling component biases the liner to move to a position under gravity that locks the coupling.

In some forms, the method further comprising a fixing arrangement for use in mounting the liner to an interior surface of the grinding mill wherein in use the mill liner is arranged to be removably mounted to the interior surface via the fixing arrangement.

Disclosed is a method for removal of a mill liner from a grinding mill, the mill liner comprising a wear surface and an opposite inner surface, a fixing arrangement for use in mounting the mill liner is arranged to be removably mounted to the interior surface via the fixing arrangement with the inner surface of the mill liner in opposed relation with an interior surface of the grinding mill, the method comprising: removing the mill liner from the interior surface of the grinding mill; and coupling a coupling tool for lifting the mill liner to at least one cavity of the inner surface of the mill liner wherein the at least one cavity is separate from the fixing arrangement. Advantageously, the method disclosed herein allows the removal of the mill liner without manual intervention of the operator.

In some forms, the at least one cavity opens to the inner surface. In some forms, the coupling tool comprises a projection that is a complementary shape to the at least one cavity and the method further comprises capturing the projection in the at least one cavity during coupling of the coupling tool and the mill liner. In some forms, the opening of the at least one cavity is generally T-shaped.

In some forms, the coupling component is spaced from the centre of gravity of the liner, and the method further comprises lifting of the mill liner through the coupling component biases the liner to move to a position under gravity that locks the coupling.

Disclosed is a coupling tool for a mill liner placement machine, the coupling tool comprising a mounting portion for releasably mounting the tool to a working arm of the machine; and an engaging portion that is arranged to interact with a coupling component disposed in or on a mill liner to form a coupling between the mill liner and the machine, the coupling being configured to allow for coupling of the mill liner to the working arm under operation of the machine without manual intervention at the coupling, wherein the engaging portion is in the form of at least one projection comprising a stem and an enlarged head that is arranged to interfit with a complementary recess formed in the mill liner.

In some forms, the mounting portion is arranged to mount to a grapple of the working arm.

In some forms, the coupling tool further comprises a stabilising portion that is operative to bear against the mill liner. In some forms, the stabilising portion extends between the mill liner and the machine.

BRIEF DESCRIPTION OF THE FIGURES

Embodiments will now be described by way of example only, with reference to the accompanying drawings in which.

DETAILED DESCRIPTION OF THE DISCLOSURE

Figure 1:
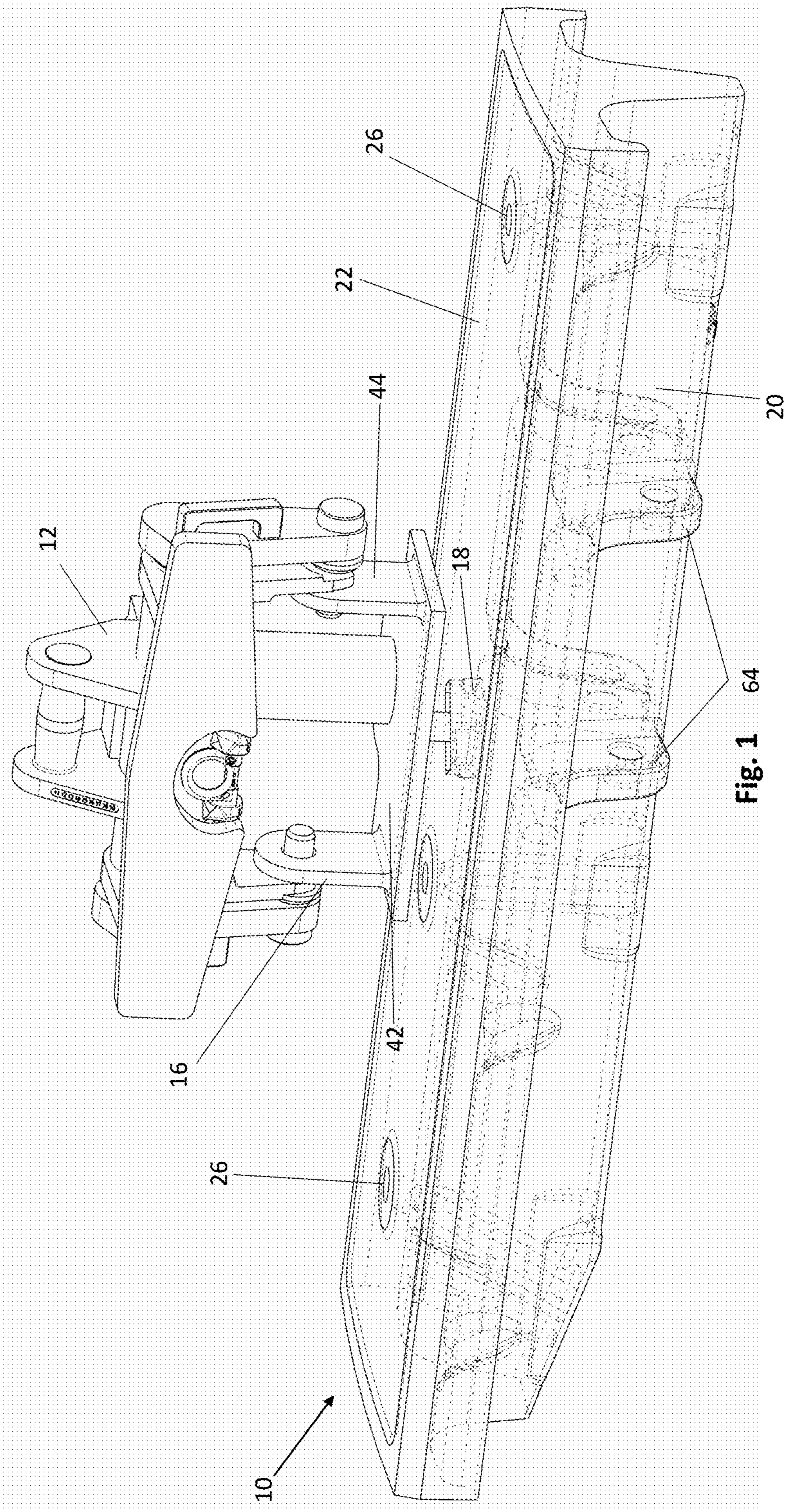
FIG. 1 is a perspective view of an embodiment of a mill liner installation and removal machine and an embodiment of a mill liner.
Figure 2A:
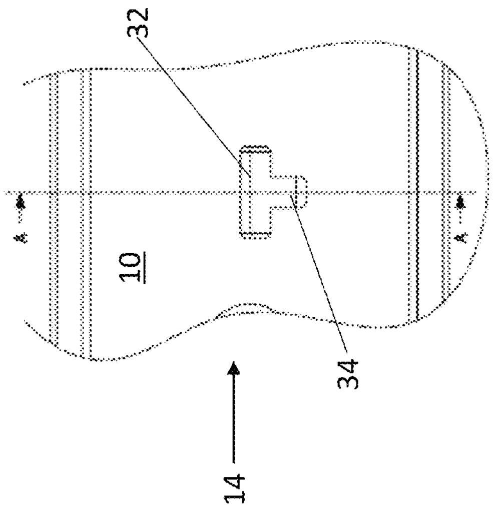
FIG. 2*a* is a plan view of an embodiment of a coupling component of a mill liner.
Figure 2B:
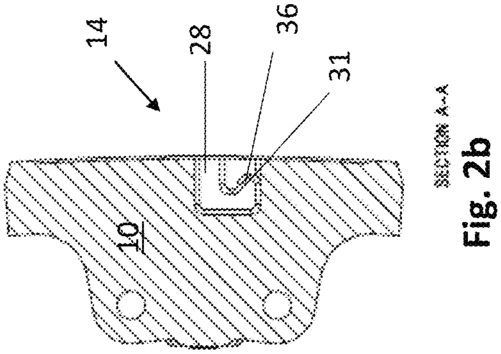
FIG. 2*b* is a cross-sectional view of the coupling component along the line A-A of FIG. 2*a;*
Figure 3A:
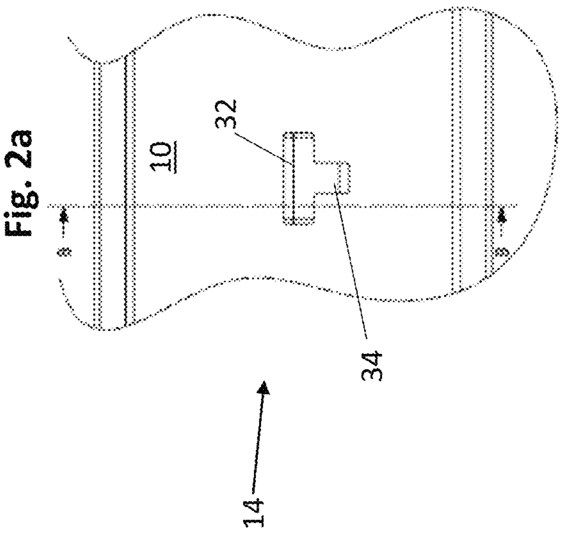
FIG. 3*a* is a plan view of the embodiment of the coupling component of FIG. 2*a;*
Figure 3B:
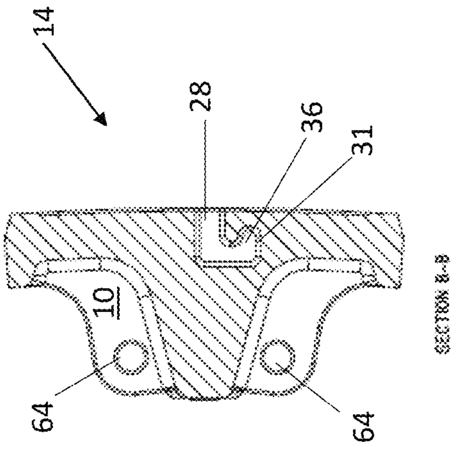
FIG. 3*b* is a cross-sectional view of the coupling component along the line B-B of FIG. 3*a;*
Figure 4C:
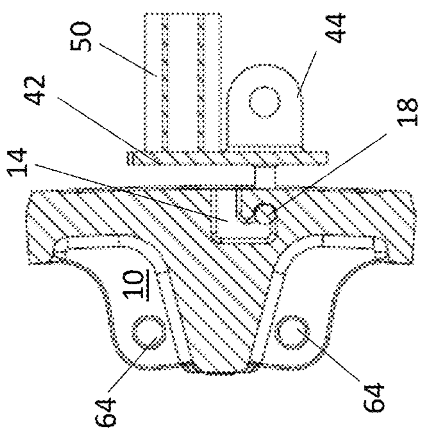
FIG. 4*c* is a cross-sectional view of the coupling tool and the mill liner of FIG. 4*a* along the line E-E.
Figure 4B:
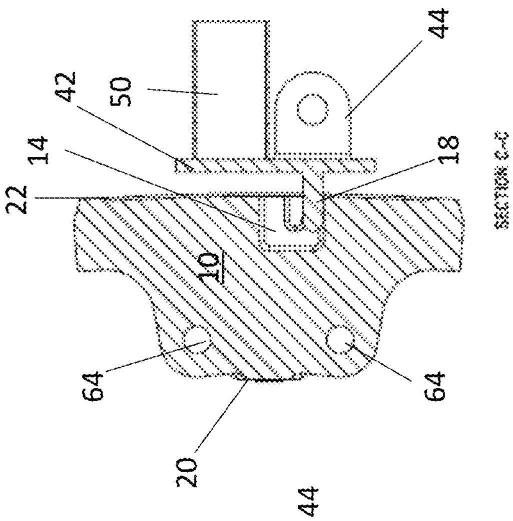
FIG. 4*b* is a cross-sectional view of the coupling tool and the mill liner of FIG. 4*a* along the line C-C.
Figure 4A:
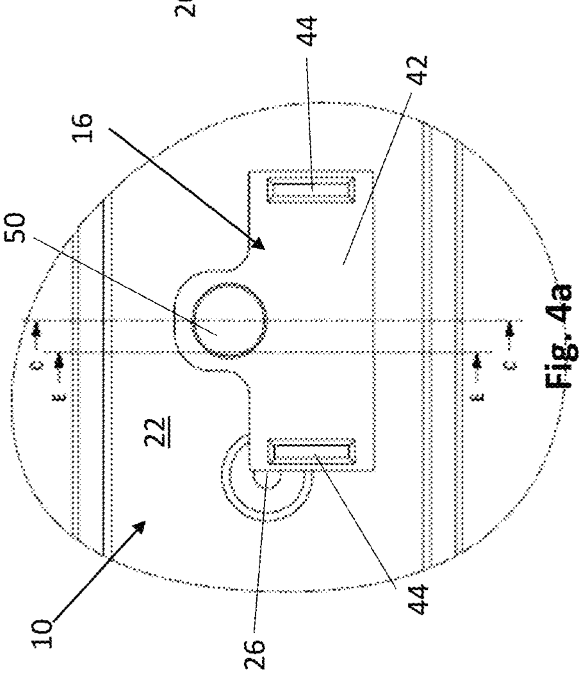
FIG. 4*a* is a plan view of an embodiment of a coupling between a coupling tool for lifting a mill liner and the mill liner of FIG. 2*a;*
Figure 5B:
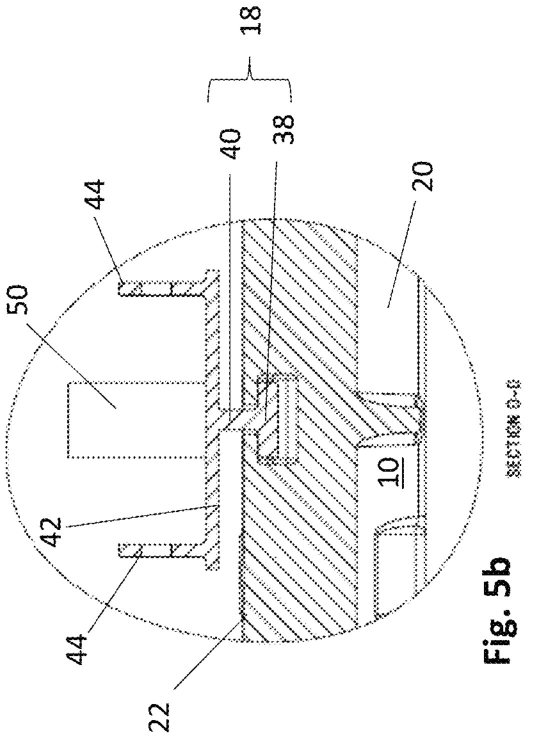
FIG. 5*b* is a cross-sectional view of the coupling tool and the mill liner of FIG. 5*a* along the line D-D.
Figure 5A:
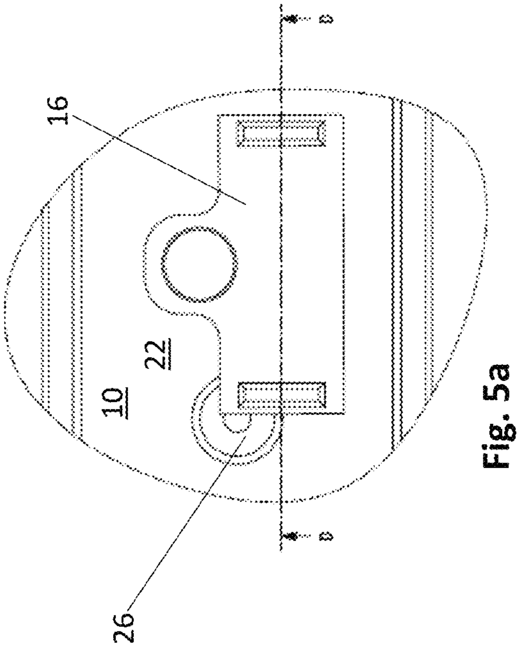
FIG. 5*a* is a plan view of the coupling tool and the mill liner of FIG. 4*a;*

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Grinding mill liners 10 are replaceable wear parts designed to suit different applications, such as SAG/AG, ball and rod mills. The mill liners 10 may be various shapes to suit the application and manufactured of cast materials (such as cast steel) or composite materials (such as fabricated metal, fabricated metal with a mixture of steel/iron and rubber, and rubber and metal (e.g., steel) to suit the application. Typically, grinding mills 1 are harsh environments which makes replacement of the worn mill liners 10 difficult and dangerous for operators. Mill liner removal and installation machines mitigate the risks involved for the operators throughout the replacement process.

In general, FIG. 1 illustrates an embodiment of a coupling of a coupling tool to an embodiment of a mill liner 10 designed to facilitate the replacement of the mill liner 10 from the grinding mill 1 without manual intervention from operators 5. In other words, the operators 5 are not required to couple a working arm of the mill liner replacement machine 12 to the mill liner 10 (as in prior art applications) and are instead solely required to operate the mill liner replacement machine(s). The mill liner includes a coupling component 14 that forms part of a coupling to connect the mill liner 10 to a coupling tool 16 releasably mountable to the working arm of the machine 12. The coupling tool 16 forms part of the coupling to lift the liner 10.

The mill liner 10 includes a wear surface 20 and an opposite inner surface 22. When installed in the grinding mill 1, the inner surface 22 is in opposed relation and abuts against an interior surface 24 of the grinding mill when the mill liner 10 is mounted to the interior surface 24 of the grinding mill. The mill liner 10 also includes a fixing arrangement 26 for removably mounting the liner 10 to interior surface 24 of the grinding mill. The coupling component 14 may be accessible via the inner surface 22 and/or the wear surface 20. In alternative embodiments, the mill liner may not be directly mounted to the interior surface of the grinding mill and may be mounted indirectly to the interior surface of the grinding mill via another liner.

FIGS. 2*a*, 2*b*, 3*a* and 3*b* illustrate in more detail an embodiment of the coupling component 14 of the mill liner 10 that is accessible via the inner surface 22. In the illustrated embodiment, the coupling component 14 includes at least one cavity 14 formed in the mill liner 10. The at least one cavity 14 is in the form of one cavity 14 that opens to the inner surface 22 of the mill liner 10. In other words, the cavity 14 does not extend through to the wear surface 20. In the plan views, the cavity 14 includes an opening 28 that is a T-shape. In the cross-sectional views, the cavity 14 includes a profile 30 that is a cane-shape incorporating a re-entrant portion 31. The T-shape is designed to allow the coupling tool 16 to enter the cavity 14 via the opening 28 at the top 32 of the T-shape and then be guided into the cavity and down and along the stem 34 of the T-shape by internal surfaces of the cavity forming the cane-shape. The end 36 of the re-entrant portion 31 of the cavity 14 is closed. In other words, the re-entrant portion 31 does not open to the inner surface 22, which captures a complementary projection 18 disposed on the coupling tool 16. As a result, the projection 18 engages behind the re-entrant portion 31 in a locked position.

In alternative embodiments, the cavity may be any shape suitable for coupling a complementary projection of the coupling tool. Further, in alternative embodiments, the cavity may be a projection, or a lug, and the coupling tool may include a cavity. In further alternative embodiments, the coupling may be in the form of a cam arrangement, or a latch assembly arrangement. The cam arrangement or the latch assembly arrangement may require actuation by the operator, and/or may be biased into the coupling or the locked position. For example, the cam arrangement may include a cam surface in the cavity and a follower on the coupling tool or vice versa.

FIGS. 4*a*, 4*b*, 4*c*, 5*a*, and 5*b* illustrate an embodiment of the coupling tool 16 for lifting the mill liner 10. The coupling tool 16 includes at least one engagement portion in the form of a projection 18. The projection 18 is complementary to the cavity 14 as discussed above in relation to FIGS. 2*a* to 3*b*. In this way, the projection 18 includes an enlarged head 38 and a stem 40. The enlarged head 38 is designed to be guided into the cavity 14 and guided by the internal surfaces of the re-entrant portion to be captured at the end 36 of the cavity 14 or behind the re-entrant portion. The projection stem 40 is designed to extend along and through the corresponding stem 34 of the T-shaped cavity 14. Advantageously, the coupling disclosed herein requires no actuation, and the projection is designed to interact with the cavity.

Figure 8B:
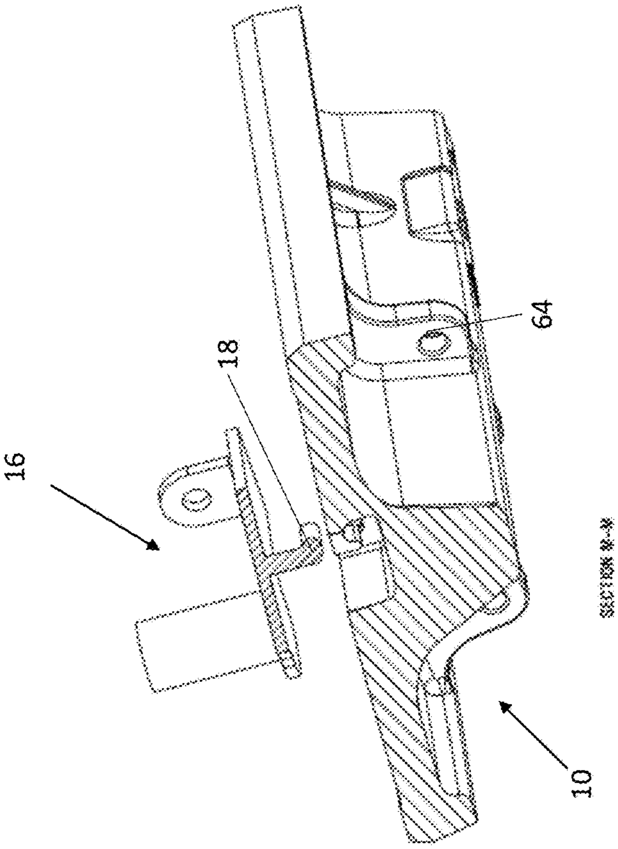
FIG. 8*b* is a cross-sectional view of the coupling tool and the mill liner along the line M-M of FIG. 8*a;*
Figure 8A:
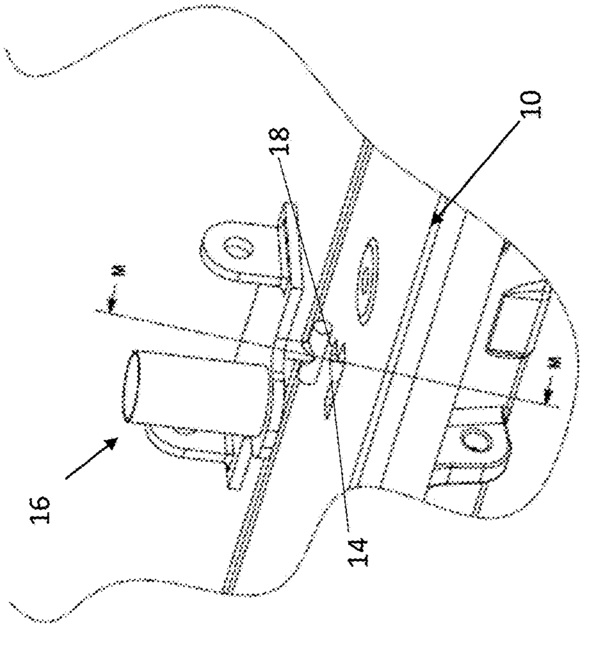
FIG. 8*a* is a close-up perspective view of a further step of the method of replacing the mill liner including a coupling tool for lifting the mill liner and the mill liner.

FIGS. 8*a* and 8*b* show the coupling 14, 18 aligned and in register prior to beginning engagement. The projection 18 is positioned above the cavity 14 and is attached to a plate 42 and a mounting portion 44. The plate 42 extends between two ends. The mounting portion 44 includes two arms 46 where one arm extends from each end of the plate 42. The mounting portion 44 is designed to be releasably mounted to a working arm of a mill liner replacement machine 12.

Figure 9B:
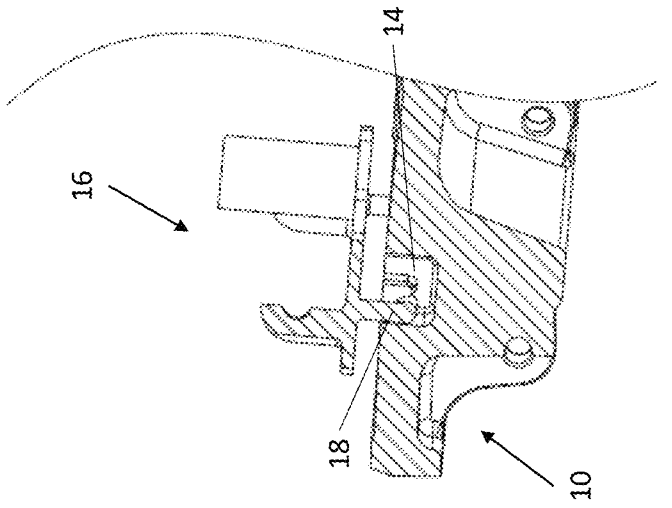
FIG. 9*b* is a cross-sectional view of the coupling tool and the mill liner of FIG. 9*a* along the line M-M.
Figure 9A:
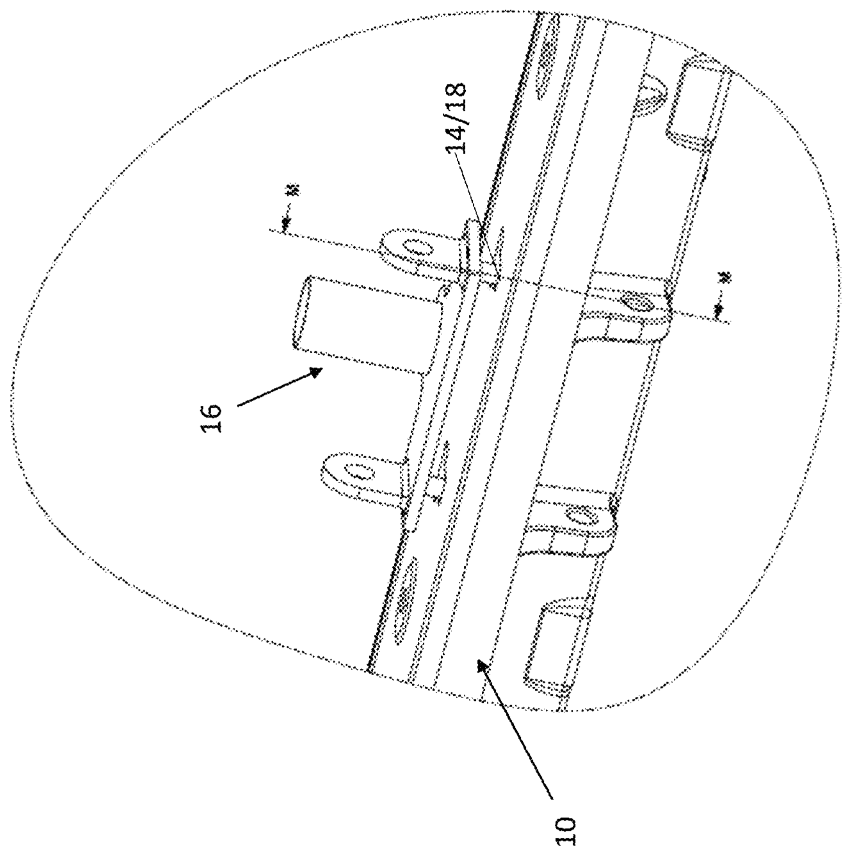
FIG. 9*a* is a close-up perspective view of a further step of the method of replacing the mill liner including the coupling tool and the mill liner of FIG. 8*a;*
Figure 10B:
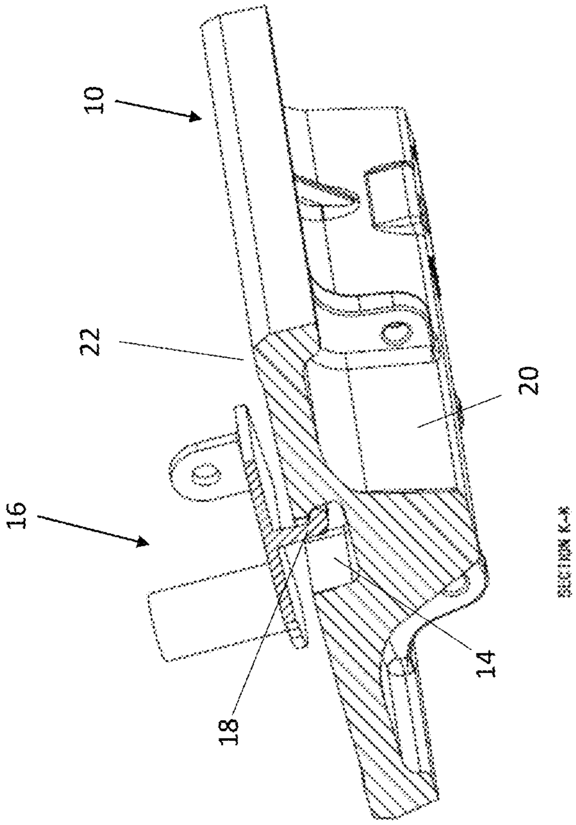
FIG. 10*b* is a cross-sectional view of the coupling tool and the mill liner of FIG. 10*a* along the line K-K.
Figure 10A:
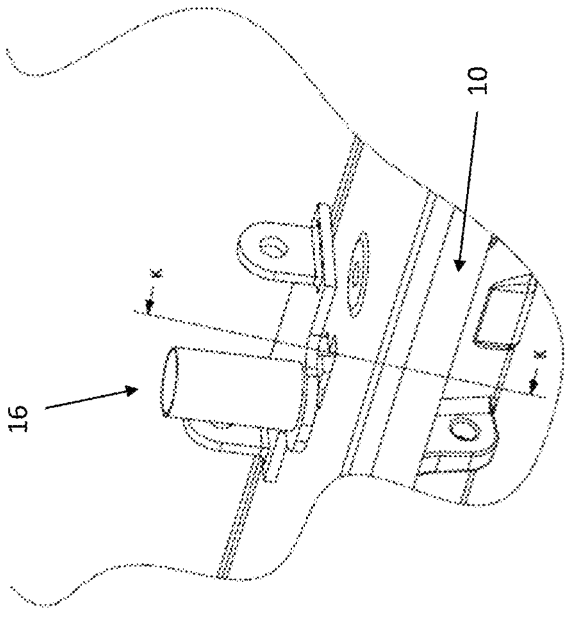
FIG. 10*a* is a perspective view of a further step of the method of coupling the coupling tool and the mill liner of FIG. 6*a* in a coupled position.
Figure 11B:
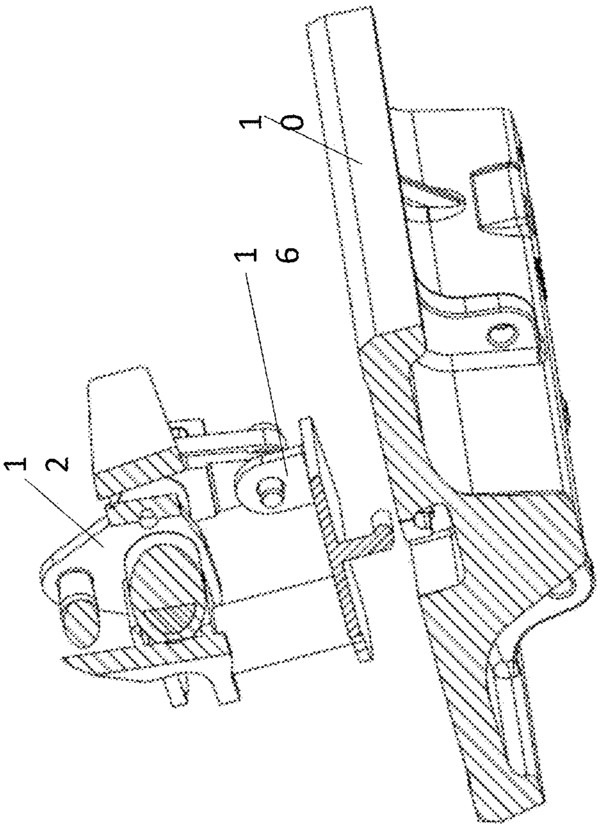
FIG. 11*b* is a cross-sectional view of the mill liner installation and removal machine, the coupling tool and the mill liner of FIG. 11*a* along the line L-L.
Figure 11A:
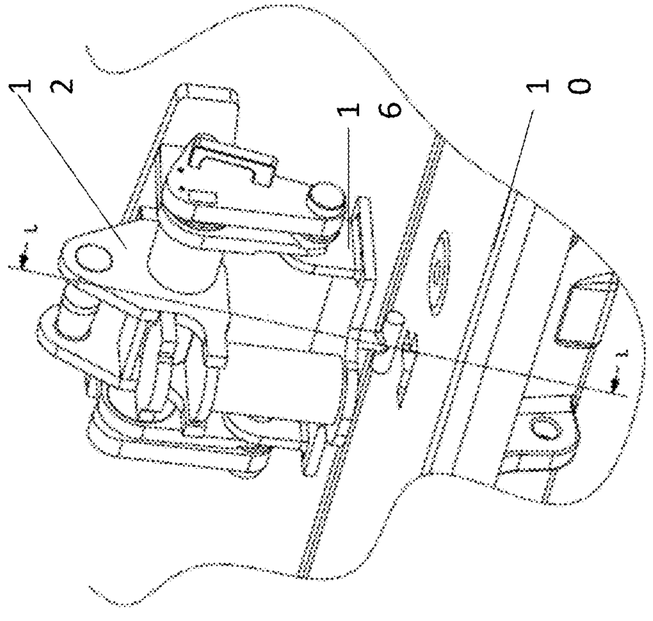
FIG. 11*a* is a perspective view of the mill liner installation and removal machine, the coupling tool and the mill liner of FIG. 1.
Figure 12B:
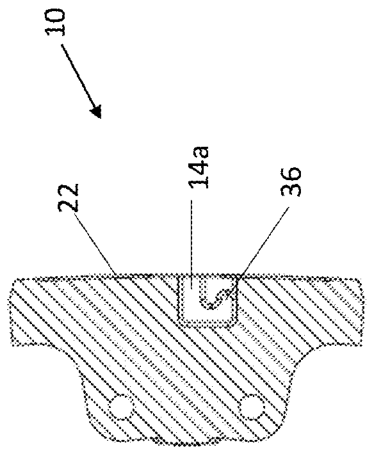
FIG. 12*b* is a cross-sectional view of the coupling component of FIG. 12*a* along the line A-A.
Figure 13B:
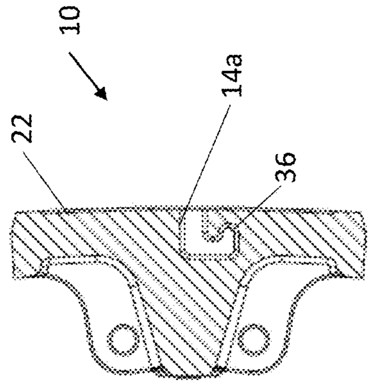
FIG. 13*b* is a cross-sectional view of the coupling component of FIG. 13*a* along the line B-B.
Figure 12A:
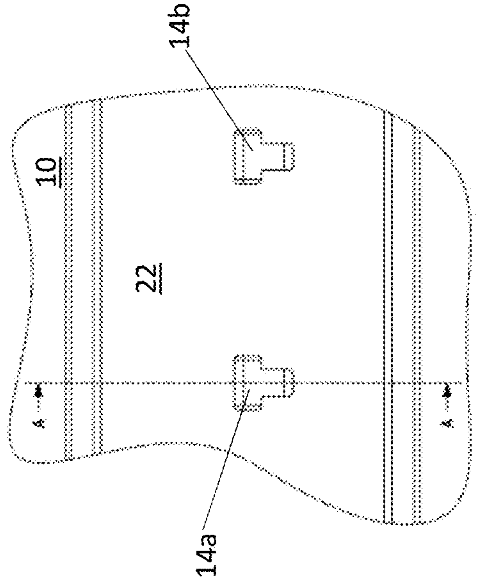
FIG. 12*a* is a plan view of an embodiment of a coupling component of a mill liner.
Figure 13A:
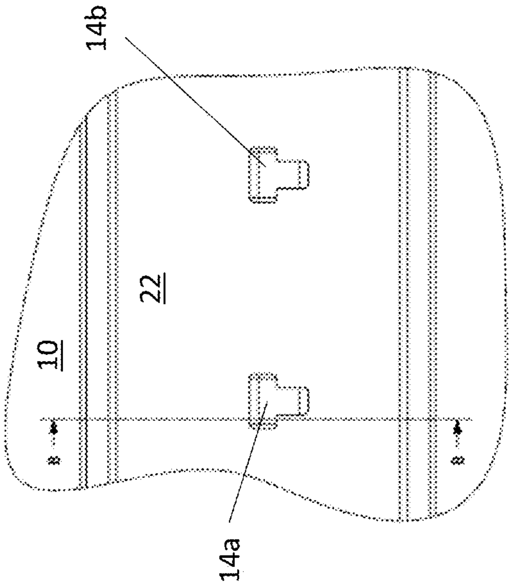
FIG. 13*a* is a plan view of the embodiment of the coupling component of FIG. 12*a;*
Figure 14A:
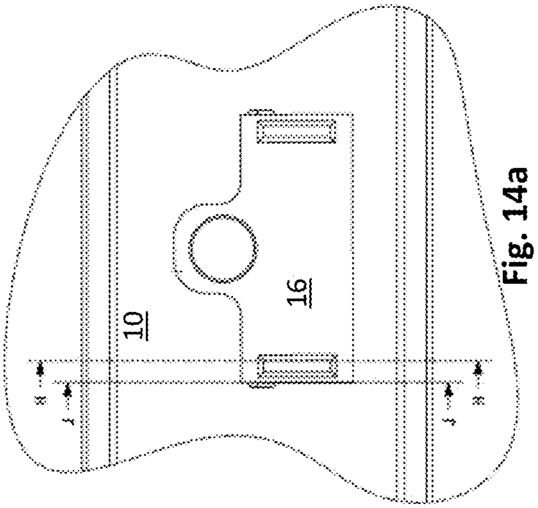
FIG. 14*a* is a plan view of an embodiment of a coupling between a coupling tool for lifting a mill liner and the mill liner of FIG. 2*a;*
Figure 14B:
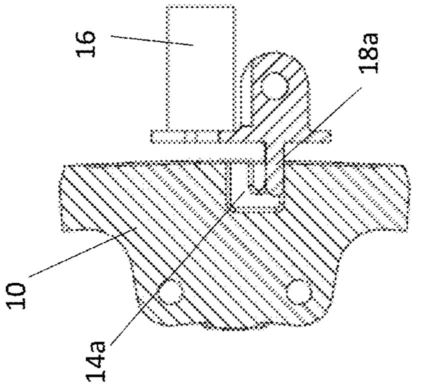
FIG. 14*b* is a cross-sectional view of the coupling tool and the mill liner of FIG. 14*a* along the line H-H.
Figure 14C:
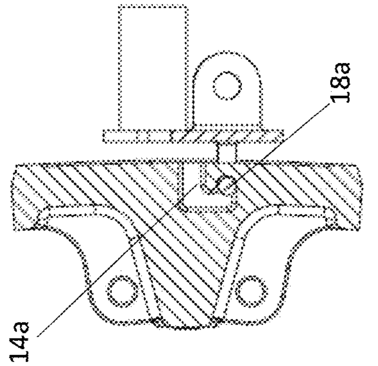
FIG. 14*c* is a cross-sectional view of the coupling tool and the mill liner of FIG. 14*a* along the line J-J.
Figure 15A:
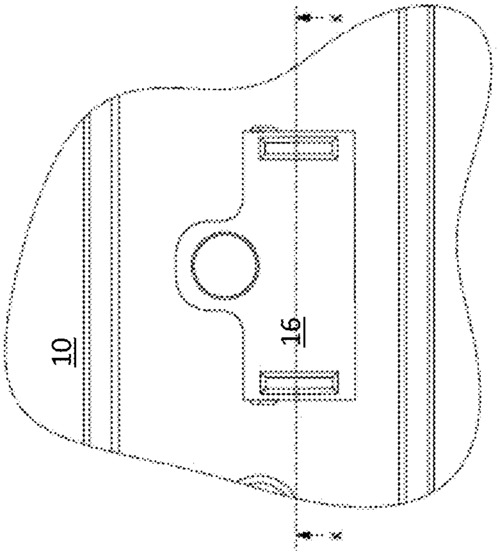
FIG. 15*a* is a plan view of the coupling tool and the mill liner of FIG. 14*a;*
Figure 15B:
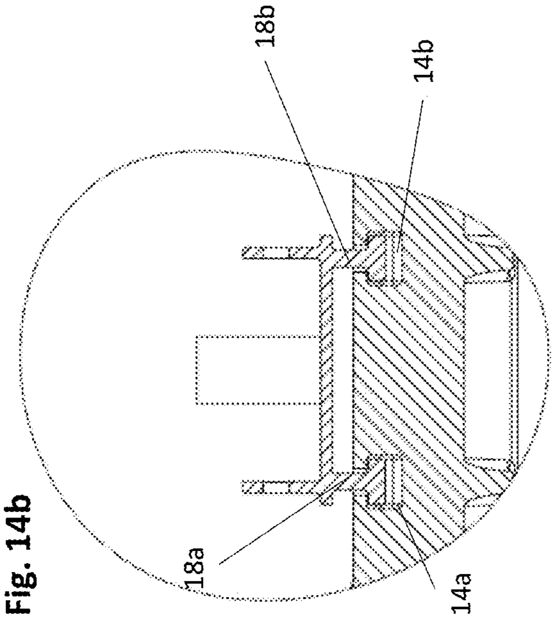
FIG. 15*b* is a cross-sectional view of the coupling tool and the mill liner of FIG. 15*a* along the line K-K.
Figure 16B:
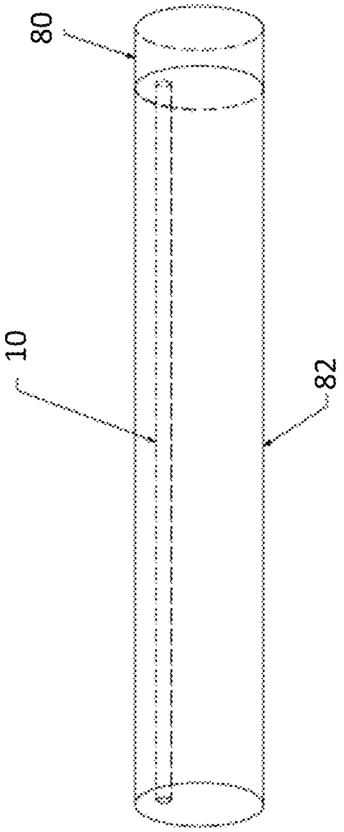
FIG. 16*b* is an isometric view of the coupling of FIG. 16*a;*
Figure 16A:
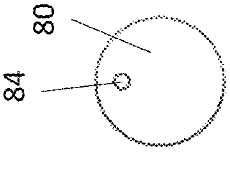
FIG. 16*a* is an end view of a further embodiment of a coupling in an uncoupled position.

The coupling tool 16 is able to be retrofit to known mill liner replacement machines shown in FIGS. 1, 11*a* and 11*b*, which is not shown in FIGS. 4*a* to 5*b*, and 8*a* to 10*b*. Typically, the known machines are designed to be coupled to the spaced apart lugs extending from the wear surface of the mill liner. As a result, the arms are spaced apart the same distance as the two lugs of the wear surface. The illustrated coupling reconfigures the known mill liner replacement machines for the disclosed application, which is primarily directed to removal or retrieval of worn mill liners but may also be directed to installation or new mill liners.

The releasable mounting arrangement 48 includes locking pins which are moveable between a locking an unlocking position to mount the coupling tool to the mill liner replacement machines. It is understood that any suitable releasable mounting arrangement may be used.

The coupling tool 16 also includes a stabilising portion which is designed to bear against the working arm of the mill liner replacement machine 12 to stabilise the coupling during lifting of the mill liner 10. The stabilising portion includes the plate 42 and a reaction foot 50 which extends from the plate 42 towards the mill liner replacement machine 12 and is operable to abut the machine 12 in certain positions during coupling and lifting of the mill liner. The plate 42 is also designed to bear against the mill liner 10. In alternative embodiments, the stabilising portion may bear against one of or both the working arm and the mill liner.

In alternative embodiments, the engagement portion may include a C-shape, U-shape, D-shape, V-shape projection, or a W-shape projection. As discussed above, the engagement portion may be defined on or in the mill liner and the cavity may be defined on or in the coupling tool.

Disclosed in FIGS. 6 to 10*b* is an embodiment of a method of replacement of the mill liner 10 described above from the grinding mill 1. The coupling tool 16 may be releasably mounted to the mill liner replacement machine 12 which is not illustrated in FIGS. 8*a* to 10*b* for the purposes of clearly illustrating the coupling tool and the coupling component of the mill liner. Typically, mill liners 10 are releasably mounted to the interior surface 24 of the grinding mill 1 via the fixing arrangement 26. When mounted, the inner surface 22 of the mill liner 10 is in opposing face relation with the interior surface 24 of the grinding mill 1 and abuts against the interior surface 24 of the grinding mill 1. The fixing arrangement 26 is in the form of holes that extend through the mill liner and a wall of the grinding mill (which includes the interior surface). Mechanical fasteners 26 extend through the aligned holes and are fastenable and releasable from exterior the grinding mill. It is understood that the fixing arrangement may be in another suitable form and is not required to extend all the way through the mill liner.

In general, replacement of the mill liners requires removal of worn mill liners and installation of new mill liners. A method of removal of the mill liner 20 from the interior surface 24 of the grinding mill will be described referring to FIGS. 6 to 10*b* which are generally in sequential order.

Figure 6:
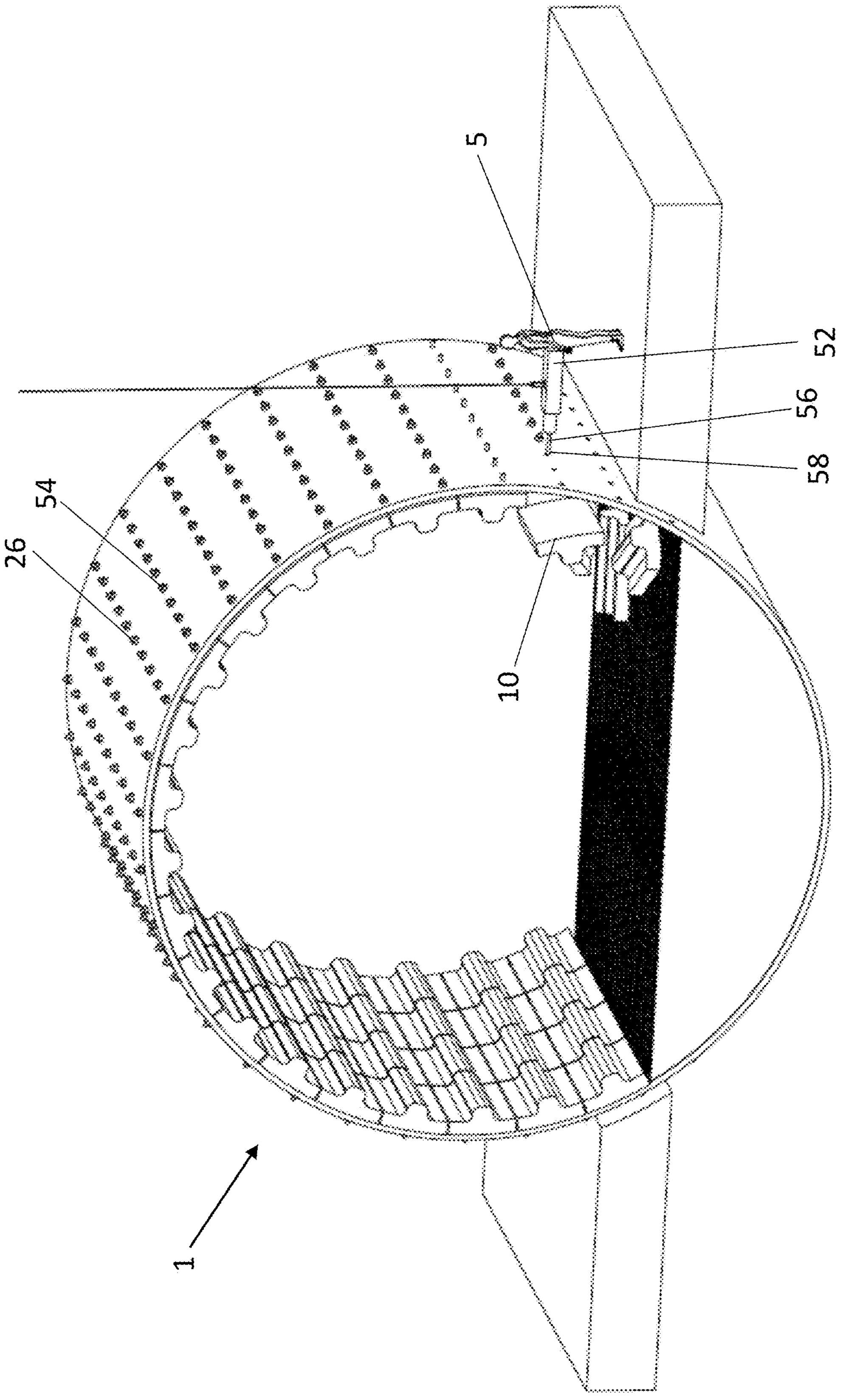
FIG. 6 is a perspective view of an embodiment of a step of a method of replacing a mill liner from a grinding mill.

FIG. 6 illustrates one of the operators 5 removing the mill liner 10 from the interior surface 24 of the grinding mill 1. The operator 5 releases the fixing arrangement 26 using a liner removal tool 52. In the illustrated embodiment, the fixing arrangement 26 is in the form of mechanical fasteners 26 mounting the mill liner 10 to the wall of the grinding mill 1. The mechanical fasteners 26 extend through aligned holes in the mill liner 10 and the wall of the grinding mill 1. The mechanical fasteners 26 generally include at least two components that are in threaded engagement to clamp the mill liner 10 to the grinding mill wall 1. Each mechanical fastener 26 includes a drive end 52 that is engageable with an end of the liner removal tool 52. Rotation of the drive end 52 either fastens or unfastens the mechanical fastener depending on the direction of rotation.

The liner removal tool 52 includes an elongate shaft 56 including the end 58 and the elongate shaft 56 is rotatable. The end 58 of the machine engages with the drive end 52 and rotates to unfasten the mechanical fastener 26. Once the mechanical fastener 26 is removed from the hole, the elongate shaft 56 of the liner removal tool 52 is operable to extend through the hole of the grinding mill wall 1 and knock-in the mill liner 10. FIG. 6 shows the mill liner 10 just after it has been removed from the interior surface 24 of the grinding mill 1 and as it is falling under gravity to the ground within the grinding mill 1. The tendency is for the mill liner to fall with the inner surface 22 facing up, and thus the inner surface 22 is accessible.

Figure 7:
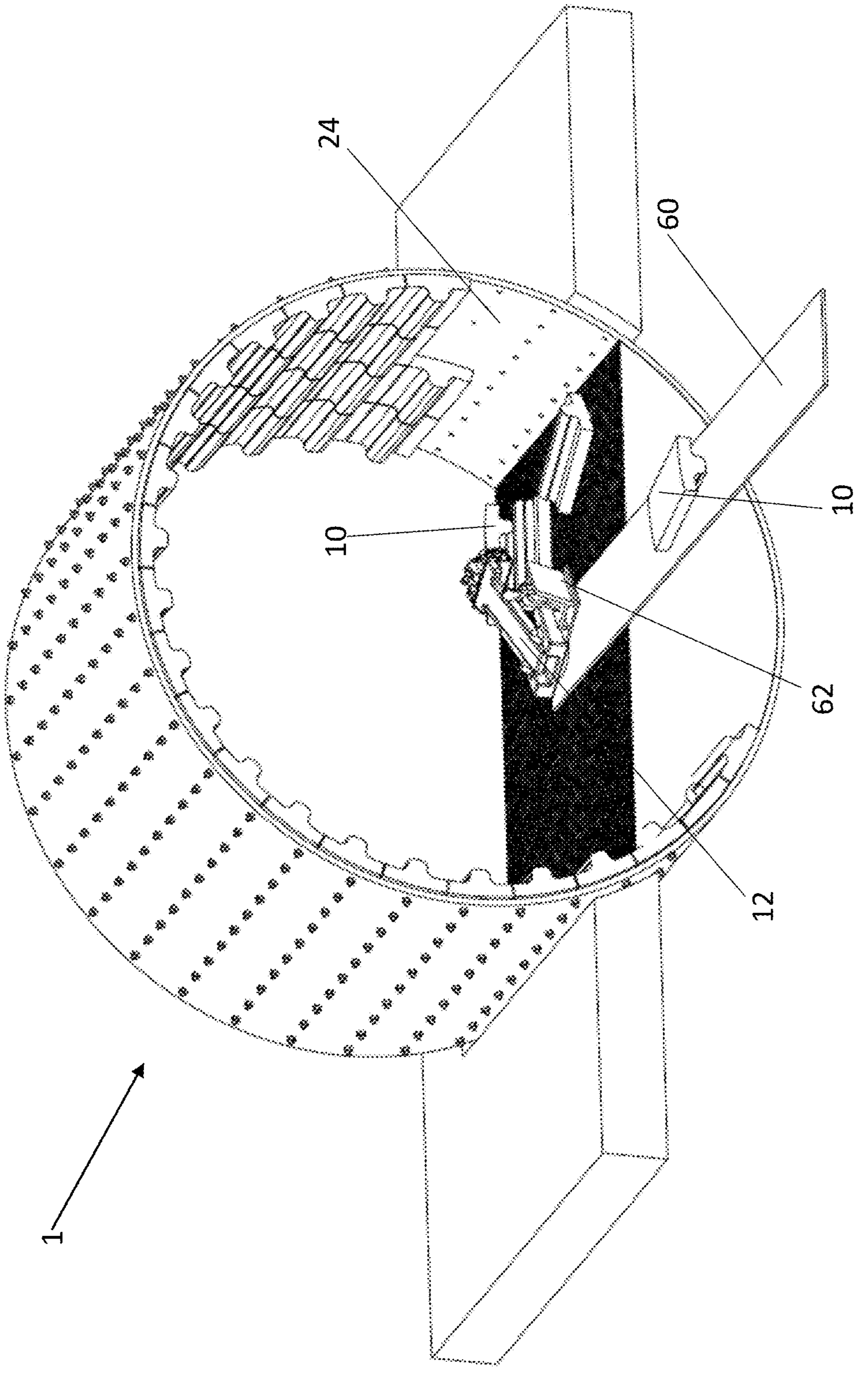
FIG. 7 is a perspective view of a further step of the method of replacing the mill liner.

FIG. 7 illustrates a plurality of mill liners 10 on the ground of the grinding mill 1 after they have been removed from the interior surface 24. FIG. 7 also shows the mill liner replacement machine 12 operating to remove the mill liners 10 one at a time from the grinding mill. In general, the coupling tool 16 for lifting the mill liners 10 is mounted to the mill liner replacement machine 12. The mill liner replacement machine 12 lifts each mill liner 10 and places it on a conveyer 60 (shown as a pallet in FIG. 7). The conveyer 60 operates on a track operating between the interior of the grinding mill 1 to the exterior of the grinding mill 1 to remove the worn mill liner 10 from the grinding mill 1. The conveyor 60 is also operable to transport new liners into the interior of the grinding mill 1, and the mill liner replacement machine 12 is also operable to install new mill liners into the wall of the grinding mill.

The operator 5 may operate the mill liner replacement machine from the interior or the exterior of the grinding mill. When the operator 5 is operating the mill liner replacement machine 12 from the interior of the grinding mill 1, advantageously, the operator is able to control a working arm of the machine from a chair 62 positioned proximal the machine which allows for good visibility and control of the working arm. Releasably mounted to an end of the working arm 12 is the coupling tool 16 for lifting the mill liner 10.

FIGS. 8*a* and 8*b* illustrate the coupling tool 16 and the mill liner 10 including the coupling component 14. The coupling tool 16 is brought proximal the coupling component 14 of the mill liner 10 but is in an uncoupled position. The projection 18 of the coupling tool is not in engagement with the cavity 14 of the coupling component.

FIGS. 9*a* and 9*b* illustrate the enlarged head 30 of the projection 18 at the opening 28 of the cavity 14 and commencing engagement.

FIGS. 10*a* and 10*b* illustrate the enlarged head 30 of the projection 18 at the end 36 of the cavity 14 in the coupled position. The cavity 14 is spaced from the centre of gravity of the liner 10 such that on lifting of the liner 10 through engagement between the enlarged head 30 of the projection 18 and the end 36 of the cavity 14, the mill liner 10 is biased to move to a position under gravity that locks the coupling. This is illustrated between the difference in the angular position of the mill liner relative to the coupling tool between FIGS. 9*a*/9*b* and FIGS. 10*a*/10*b*. In FIGS. 10*a* and 10*b*, the position of the mill liner 10 is such that in order to uncouple the coupling a force needs to be applied to the at least a portion of the wear surface 20 to guide the coupling tool 16 back through the cavity 14 to exit the cavity 14 via the opening 28.

In the illustrated embodiment, the coupling component 14 is accessible via the inner surface 22 of the mill liner 10. In alternative embodiments, the coupling component may be accessible via either or both the inner surface and the wear surface. In this regard, the mill liner may fall from the wall of the grinding mill and land with either the wear surface or the inner surface facing up. Depending on the removal technique, the mill liner may have a tendency to land with either the wear surface of the inner surface facing up, and thus either surface is accessible for coupling to the coupling tool. The grinding mill 1 is a harsh environment, and particularly, removal of the worn mill liners is an onerous and dangerous job for the operators 5. Advantageously, the method disclosed herein is able to be performed by operators without manual intervention. The operators 5 are able to remove the mill liners without manually removing the liners 10 from the interior surface 24 of the grinding mill 1, and without manually coupling the liners 10 to the mill liner replacement machine 12. Thus, the method discloses herein has safety benefits for operators by mitigating the risks involved in the replacement of worn mill liners.

FIGS. 11*a* and 11*b* illustrate a close-up perspective view of the coupling tool 16 releasably mounted to the mill liner replacement machine 12. The illustrated working arm of the mill liner replacement machine 12 is a known machine. The coupling tool 16 is releasably mounted to the machine for the purpose of reconfiguring the known machine for the disclosed purpose. The machine 12 typically operates by coupling the spaced arms to mounting lugs 64 that extend from the wear surface 20.

A second embodiment of a coupling is disclosed in FIGS. 12*a* to 15*b*. The same reference numerals are used for like features. The primary difference between the first embodiment of the coupling and this embodiment of the coupling is there are two cavities 14*a*, 14*b* and two complementary projections 18*a*, 18*b*. The advantage in relation to this embodiment, is the two couplings provide increased stability, especially in embodiments that also include the stabilising portion. The couplings are the same shape and function the same way through the same method as discussed above.

A third embodiment of a coupling is disclosed in FIGS. 16*a* to 17*c*. The same reference numerals are used for like features. In the illustrated embodiment, disclosed is an embodiment of an actuated locking arrangement being in the form of a cam arrangement. The cam arrangement is designed to be releasably mounted to an embodiment of the coupling tool in lieu of the projection. The cam arrangement generally includes a cam 80 that is rotatably attached to a body 82 via a shaft 84. The shaft could be cylindrical or another shape e.g. oval, square, rectangle etc. The body 82 is elongate and extends between two ends. The shaft 84 extends though the body 82 and the cam 80 is fixed to an end of the shaft 84 at one of the ends of the body.

Rotating the shaft 84 moves (e.g., rotates) the cam 80 relative to the body 82 between a coupling (or locked) and an uncoupling position.

Figure 17B:
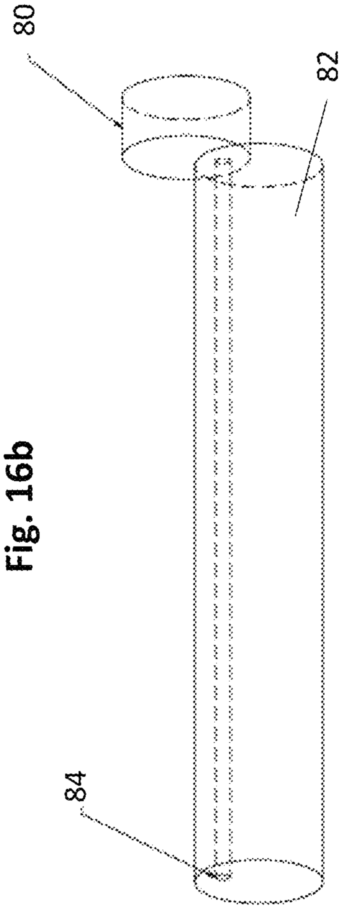
FIG. 17*b* is an isometric view of the coupling of FIG. 17*a*.
Figure 17A:
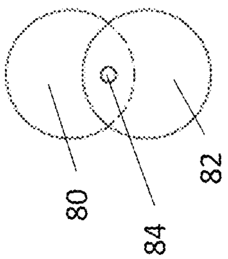
FIG. 17*a* is an end view of the coupling of FIG. 16*a* in a coupling position.
Figure 17C:
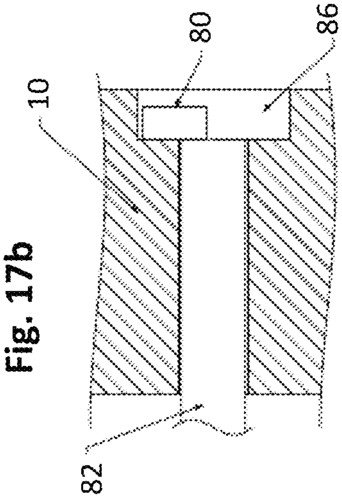
FIG. 17*c* is a cross-sectional view of the coupling of FIG. 17*b.*
Figure 19B:
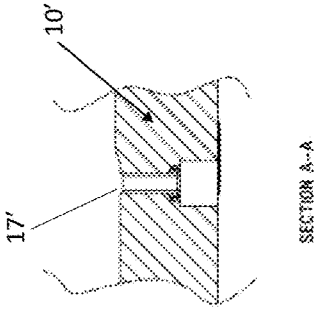
FIG. 19*b* is a cross-sectional view of the mill liner of FIG. 19*a* along the line A-A.
Figure 19A:
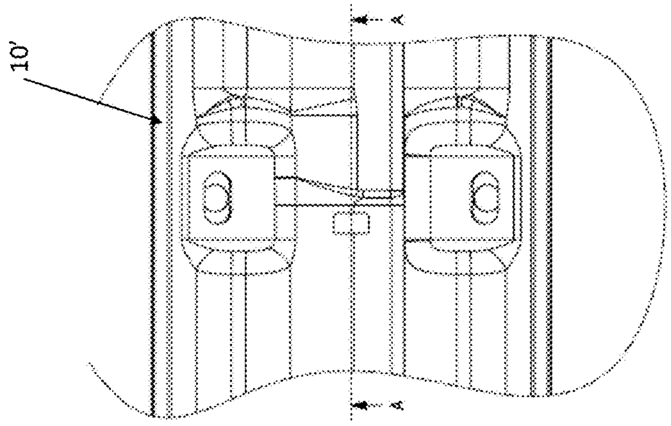
FIG. 19*a* is a plan view of an embodiment of a coupling component of a mill liner.

The cam is shaped to fit into a complementary coupling cavity in the mill liner that includes and opens up to an enlarged cavity 86 within the liner (e.g., a counterbore). The enlarged cavity includes at least one shoulder 88 for engaging the cam 80 in the coupling position. As shown in FIG. 17*c*, an operator actuates the shaft 84 by rotating the shaft 84 which rotates the cam 80 to engage the shoulder 88 in the coupling position. This prevents the coupling tool 16 from being removed from the cavity in the mill liner 10 and allows lifting and as such removal and installation of the mill liner 10. Also disclosed, but not illustrated, is an embodiment of a mill liner that may include a coupling component disposed within the liner. The coupling component may be in the form of a blind cavity that is accessible for coupling to a coupling tool after the wear surface is worn. In this way, the cavity is only visible and accessible once the liner has been worn down during operation of the grinding mill. As discussed above, the cavity is shaped to capture a complementary projection disposed on the coupling tool. The opening of the cavity may be T-shaped or any suitable shape which is able to capture the complementary projection to form the coupling. Advantageously, this arrangement provides a practical wear indicator notifying operators when the mill liner needs to be replaced.

Alternatively, a blind cavity may be disposed within the liner to operate solely as a wear indicator and not necessarily required to also function as a coupling component.

Alternatively, the cavity may be visible before the liner has been worn down during operation of the grinding mill. In this way, when the liner is new (and not worn) an opening to the cavity may visible. The opening to the cavity has relatively small dimensions (or diameter depending on its shape) which increases in size as the liner wears. The size of the opening to the cavity may operate as a wear indicator such that once the cavity is large enough to function as a coupling component, then the liner is worn.

Figure 18B:
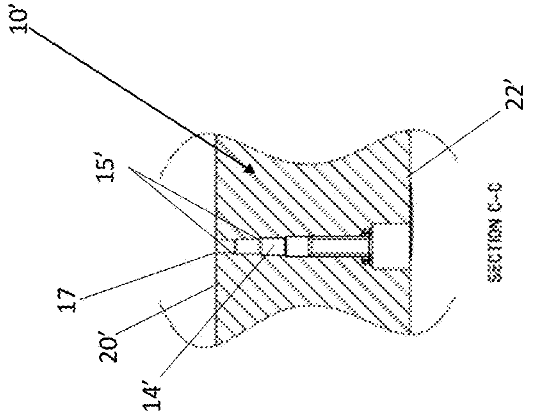
FIG. 18*b* is a cross-sectional view of the mill liner of FIG. 18*a* along the line C-C.
Figure 18A:
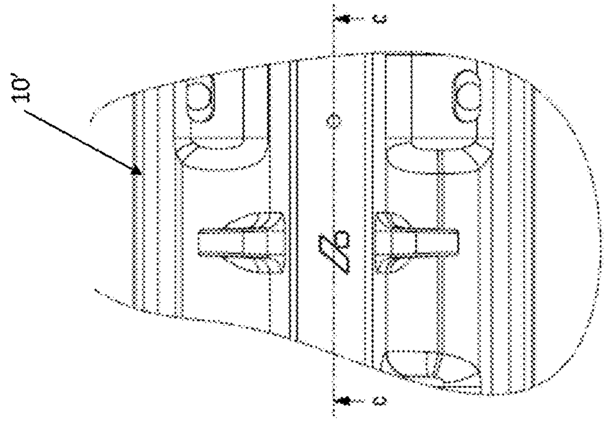
FIG. 18*a* is a plan view of an embodiment of a coupling component of a mill liner.

FIGS. 18*a* to 21*b* illustrate coupling components (that form part of a coupling between a coupling tool and the mill liner) in the form of cavities that also provide an indication of liner wear. As best illustrated in FIGS. 18*a* and 18*b*, the cavity 14' may take the form of a conical, i.e. tapered, through-hole. The tapered cavity 14' may comprise tapered steps 15', or alternatively may comprise a smooth transition between opposing open ends. The cavity 14' may open to the inner surface 22' of the mill liner 10' and extend through to the wear surface 20'. The wear surface opening 17 may have a smaller diameter when compared to the projection 18 (not shown) of the coupling tool 16 (not shown). As such, coupling tool 16 cannot pass through opening 17 to couple with mill liner 10' until sufficient wear has occurred on wear surface 20'. Referring to FIGS. 19*a* and 19*b*, mill liner 10' is shown with sufficient wear to reveal an opening 17' in cavity 14' of sufficient diameter, i.e. equal to or larger than the diameter, of complimentary projection 18 (not shown).

A further alternative embodiment of a mill liner is disclosed in FIGS. 20*a* to 21*b* which includes a wear indicator 90 may include an electronic sensor arrangement. The electronic sensor arrangement may be mounted within the wear indicator or may be separate to the wear indicator.

In the illustrated embodiment, the wear indicator 90 is disposed within a coupling component of a liner. The wear indicator 90 is fixed on an internal surface of cavity 14. The cavity 14 is accessible for coupling to a coupling tool with the wear indicator disposed in cavity 14. The cavity 14 may extend the full width of a mill liner 10, i.e., extend from the inner surface 22 to the wear surface 20. The wear indicator may extend along the full length of the cavity 14, terminating at the wear surface 20 of the mill liner 10.

Figure 21A:
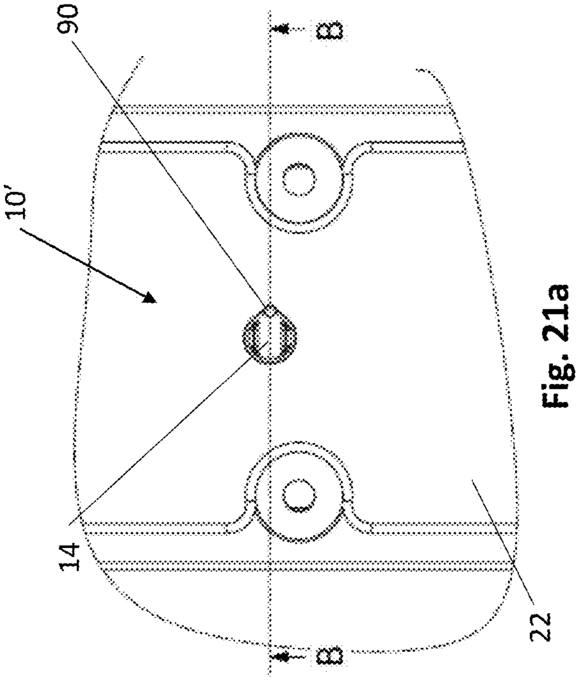
FIG. 21*a* is a plan view of an embodiment of a coupling component of a mill liner.
Figure 21B:
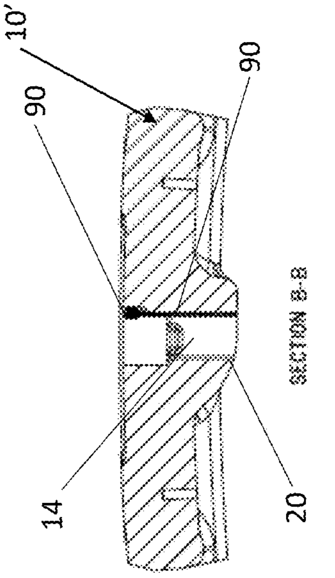
FIG. 21*b* is a cross-sectional view of the mill liner of FIG. 21*a* along the line B-B.
Figure 20A:
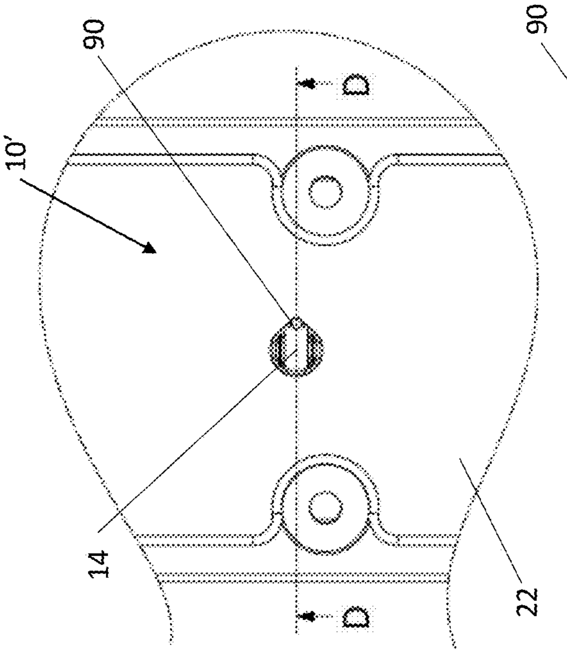
FIG. 20*a* is a plan view of an embodiment of a coupling component of a mill liner.
Figure 20B:
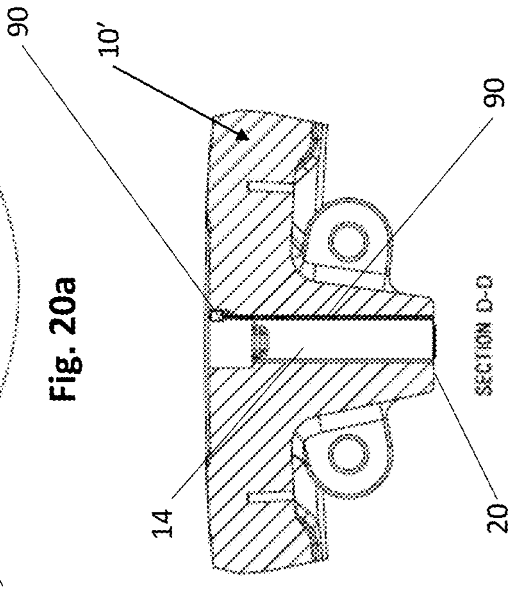
FIG. 20*b* is a cross-sectional view of the mill liner of FIG. 20*a* along the line D-D.

The wear indicator 90 is designed to reduce in length as the wear surface 20 is worn down. The electronic sensor arrangement may include an electronic device and a microprocessor or controller which may be installed within the wear indicator 90 to record the reduction in length as the wear surface 20 is worn down. As best shown in FIGS. 21*a* and 21*b*, the more degradation the wear surface 20 experiences, the less remaining material of the wear indicator 90. A feedback loop is programmed into the microprocessor to track deformation of the mill liner. This information may be reported to a display module or other visually indicator to alert an operator when the mill liner has substantially deteriorated, and the liner should be replaced.

The electronic sensor arrangement may also monitor performance of the mill and report information relating to the operation of the mill to operators.

Depending on consumer preferences and requirements any number of couplings may be suitable. For example, many variations of the couplings may be retrofit on a corresponding mill liner. Further embodiments of a coupling are disclosed in FIGS. 22 to 28. The primary difference between the first embodiment of the coupling and the further alternative embodiments of the coupling disclosed in FIGS. 22 to 28, is there are two projections on each coupling tool and two complementary cavities (not shown) in a corresponding mill liner. The same reference numerals are used for like features. Additionally, the further alternative embodiments disclose alternative shaped projections disposed on the coupling tool to correspond with complimentary cavities in a mill liner. Each of the alternative embodiments of a coupling will now be described.

Figure 22A:
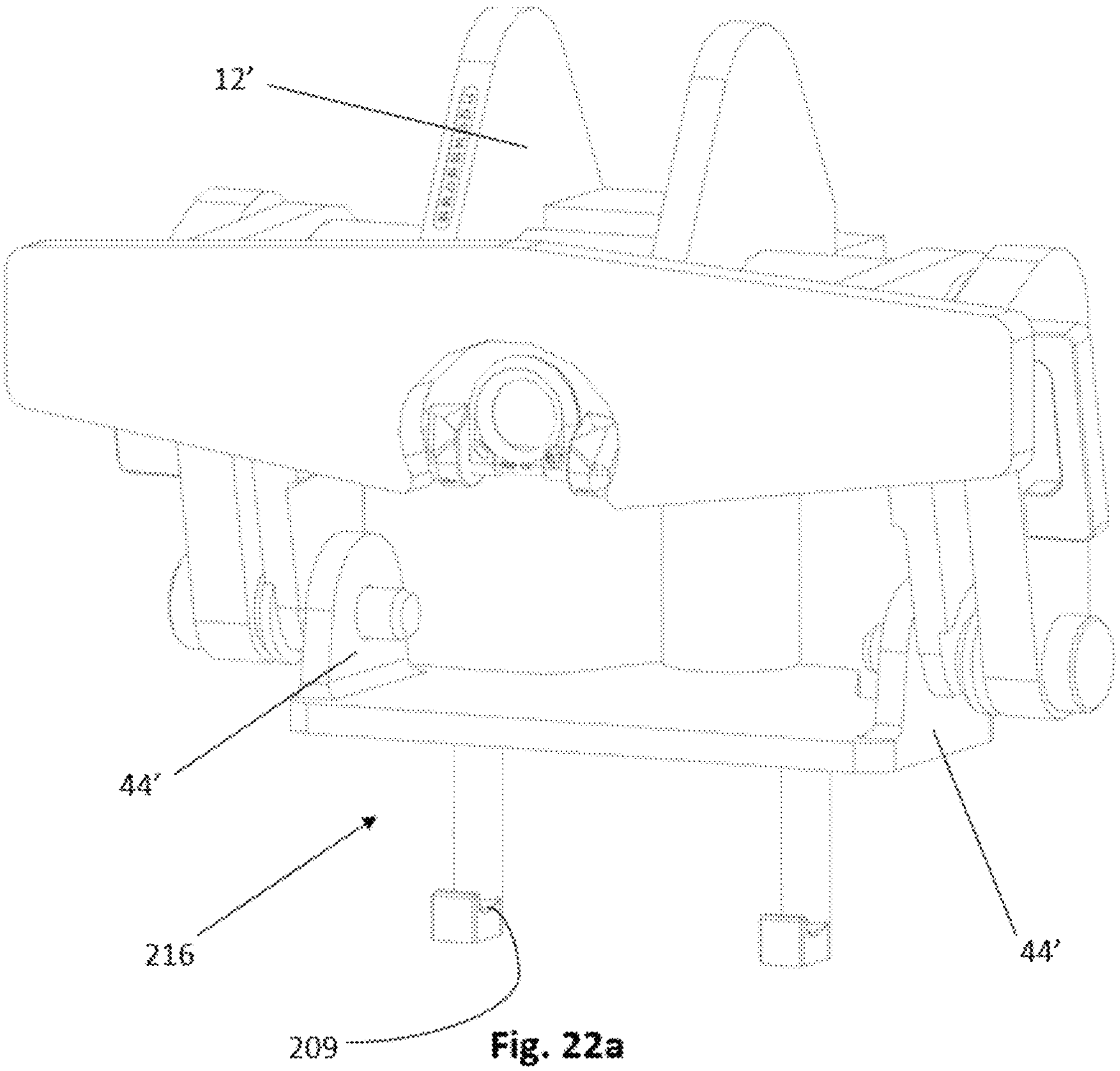
FIG. 22*a* is a perspective view of a further embodiment of a coupling tool releasably mounted to a mill liner replacement machine.
Figure 22B:
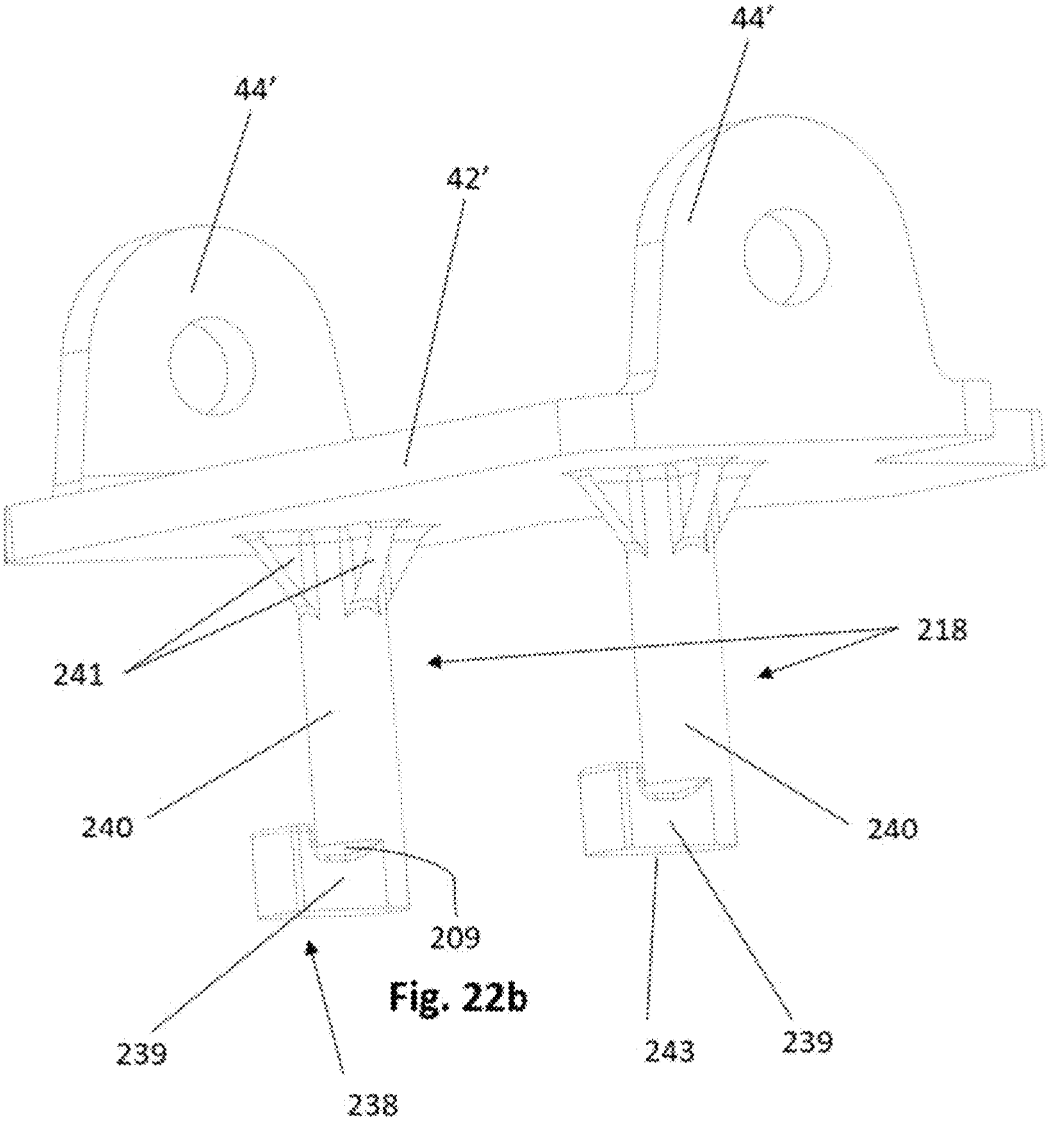
FIG. 22*b* is a perspective view of the further embodiment of a coupling tool of FIG. 22*a*.
Figure 22C:
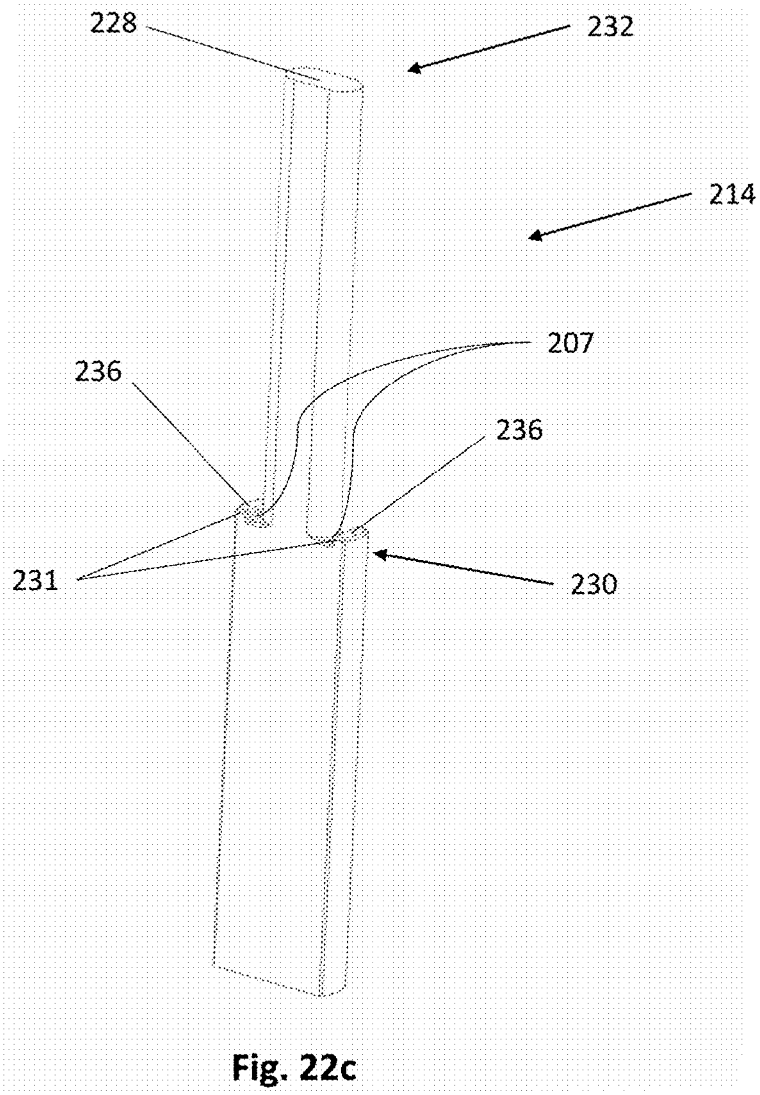
FIG. 22*c* is a perspective view of a mill liner core corresponding to the coupling tool of FIG. 22*b*.

Referring now to FIGS. 22*a*, 22*b* and 22*c*, a fourth embodiment of a coupling is shown. Referring to FIG. 22*a*, the coupling tool 216 may be assembled to the mill liner replacement machine 12' about mounting portions 44'.

Referring to FIG. 22*b*, the fourth embodiment differs from the first embodiment (of FIGS. 1 to 11) in that an enlarged head 238 of the further alternative embodiment comprises a single protrusion 239. The protrusion has generally a hook-shape profile. Along an internal surface of its hook-shape profile is an abutment surface 209. The abutment surface 209 will contact a corresponding abutment surface within a cavity 214 of the mill liner to couple the coupling.

The protrusions 239 of the enlarged heads 238 may be integrally formed with stems 240 projecting from plate 242. One or more webs 241 extend radially from stems 240 and adjoin plate 242. Together, the stem 240 and the protrusion 239 generally forms an L-shape, i.e. are perpendicular to each other. The protrusions 239 may be orientated radially about stem 240 in any direction. In the fourth embodiment of FIG. 22*b*, both protrusions 239 are orientated in the same direction, extending from the stem 240 in a direction generally parallel with a longer surface of the mounting portions 44'.

A terminal end 243 of the projection 218 may be a flat surface orientated substantially perpendicular to stem 240. Referring now to FIGS. 22*b* and 22*c*, the stem 240 and protrusion 239 may have a cross-sectional profile substantially corresponding with at least part of the shape of opening 228 of cavity 214. For example, the stem 240 of projection 218, shown in FIG. 22*b*, may be cylindrical, i.e. have a circular cross-sectional profile. The protrusion 239 of enlarged head 238 may have a substantially rectangular cross-section, wherein one end adjoining the stem 240 may be rounded. Alternatively, both ends of enlarged head 238 may be rounded to form an obround cross-sectional profile (as best seen from a bottom view of the projections 218).

Referring to FIG. 22*c*, a profile of cavity 214 is shown as a solid body, i.e. a negative form of cavity 214. The cavity 214, when viewed from the top 232, includes an opening 228 that may be an obround shape. The cavity 214, when viewed from the side, i.e. normal to the plane defined by the opening 228, includes a profile 230 that may be an anchor-shape. This profile differs from the first embodiment of the coupling, in that there are two re-entrant portions 231 disposed in a mirror image relation, i.e. the two portions 231 are separated rotationally by one-hundred-and-eighty degrees. Advantageously, the projections 218 can connect with either one of re-entrant portions 231. In other words, the coupling tool 216 may be bidirectional and orientated to align with either re-entrant portion 231 of cavity 214.

The ends 236 of the re-entrant portions 231 are closed. In the same way as the first embodiment, re-entrant portions 231 of the further embodiment capture a complementary protrusion 239 disposed on the projection 218. The corresponding abutment surface 207 of the cavity is formed along a surface which defines the internal profile of one of the re-entrant portions 231.

In use, the operator aligns each projection 218 with the respective cavity 214. This is typically done remotely. The internal walls of the respective cavity 214 guide the projection 218 to the re-entrant portions 231. The operator manipulates the projections 218 within the cavity 214 to guide the abutment surface 209 and the corresponding abutment surface 207 into engagement. Further, the cavities are spaced relative to the centre of gravity of the liner 10' such that on lifting of the liner 10' through engagement between the abutment surface 209 of the projection 218 and the corresponding abutment surface 207 of the re-entrant portion 231, the mill liner 10 is biased to move to a position under gravity that locks the coupling.

The cavity 214 may be formed in either the wear surface 20' or the inner surface 22' of the mill liner 10'. When the cavity 214 is formed in the wear surface 20', the coupling tool 216 may be coupled to the mill liner 10' while the mill liner is fixed to the interior surface 24 of the grinding mill. Once the coupling is in engagement, the mechanical fasteners 26 may be released and the mill liner removed from the grinding mill. When the cavity is formed in the inner surface, the mill liner may be removed as discussed above. This coupling is advantageous as it is a relatively simply design with a mechanical interlocking coupling engagement.

Figure 23A:
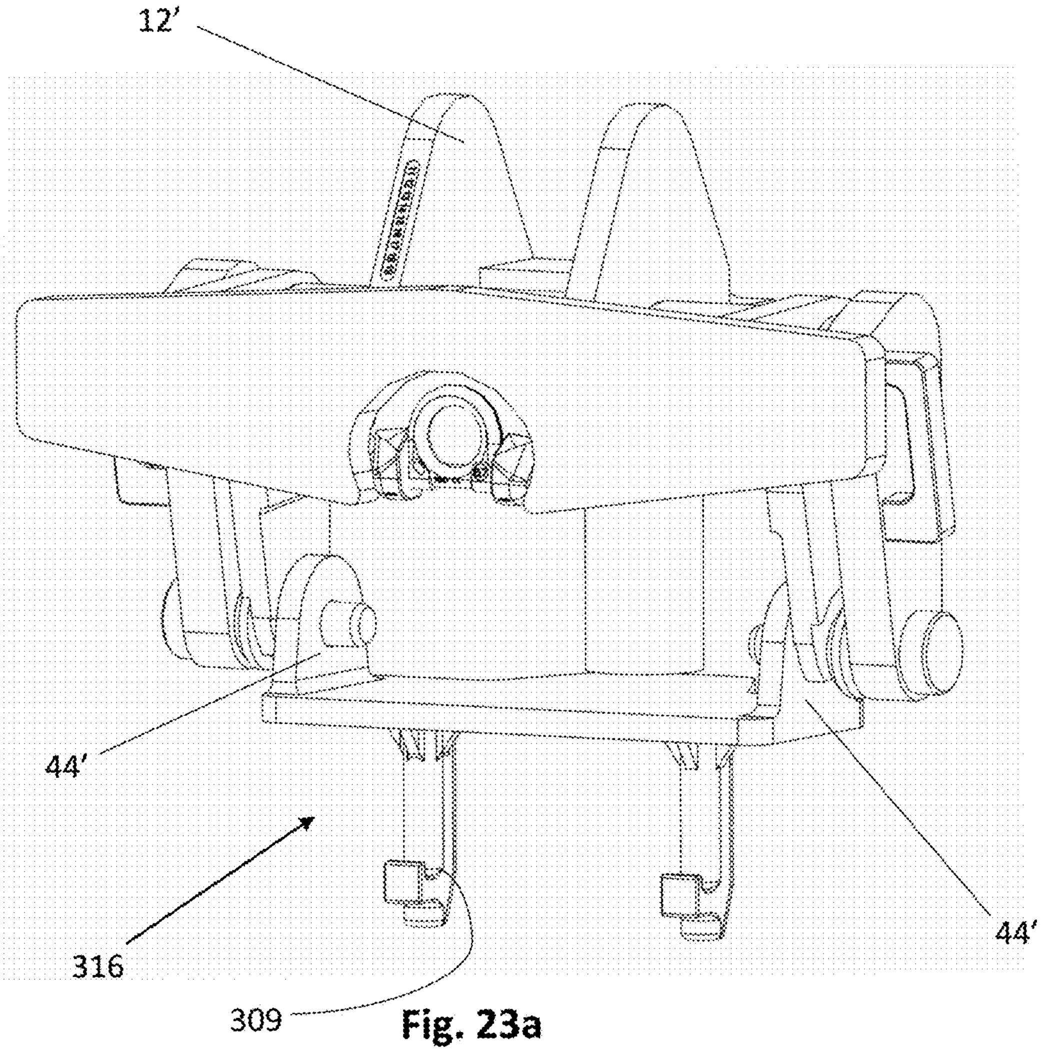
FIG. 23*a* is a perspective view of a further embodiment of a coupling tool releasably mounted to a mill liner replacement machine.
Figure 23B:
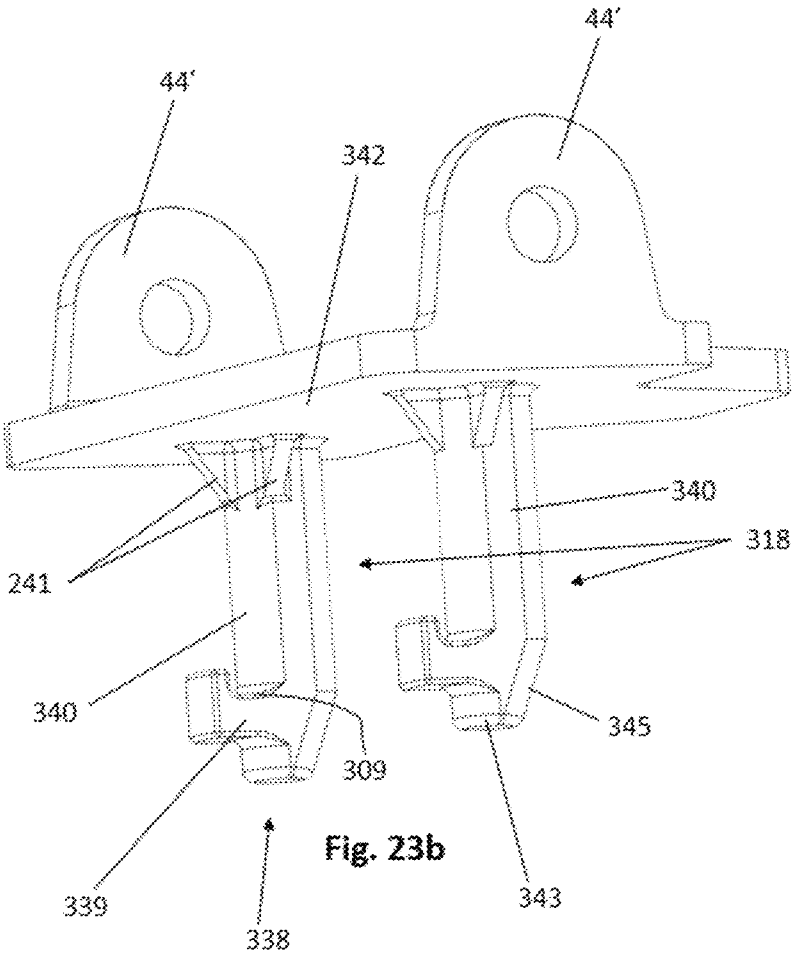
FIG. 23*b* is a perspective view of the further embodiment of a coupling tool of FIG. 23*a*.
Figure 23C:
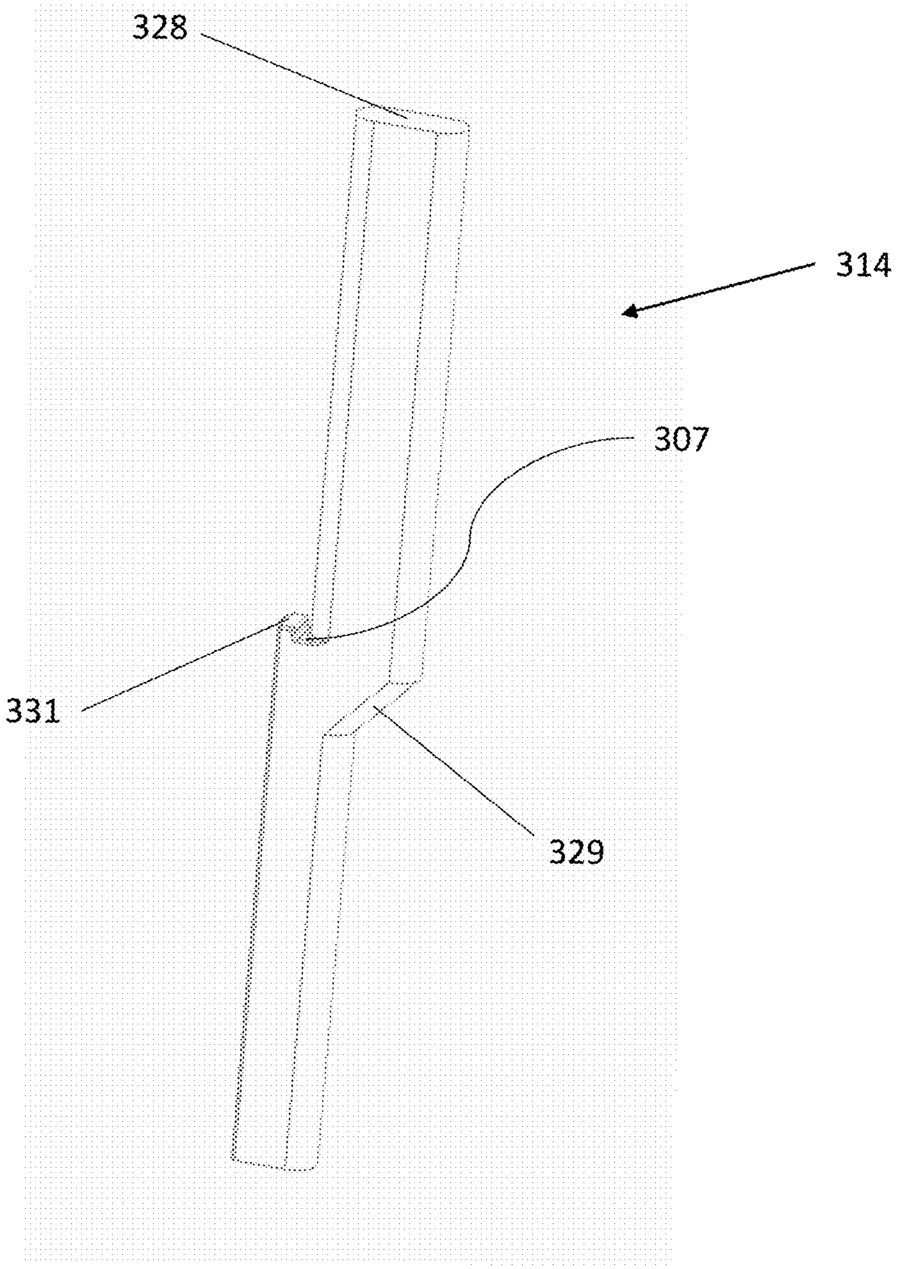
FIG. 23*c* is a perspective view of a mill liner core corresponding to the coupling tool of FIG. 23*b*.

Referring now to FIGS. 23*a*, 23*b* and 23*c*, a fifth embodiment of a coupling is shown. Referring to FIG. 23*a*, the coupling tool 316 may be assembled to the mill liner replacement machine 12' about mounting portions 44'.

Referring to FIG. 23*b*, the fifth embodiment may be substantially identical to the fourth embodiment (of FIG. 22*b*). The fifth embodiment differs from the fourth embodiment at the terminal end 343 of the projection 318, where a portion of the stem 340 proximal to the terminal end 343 may comprise an angled portion 345, i.e. a chamfer or bevel. The angled portion 345 may extend along the surface of the stem 340 from the terminal end 343 to a point between the terminal end 343 and the plate 342. Like reference numerals are used for like features.

Referring to FIG. 23*c*, a profile of cavity 314 is shown as a solid body. Each cavity 314 may be very similar to the fourth embodiment (FIG. 22*c*) and differs in that only a single re-entrant portion 331 may be present. Additionally, the surface vertically opposite the re-entrant portion 331 comprises a sloped surface 329 with an angle corresponding substantially with the angled portion 345 of projection 318.

The projections 318, in-use, are guided through the cavity 314, in a direction moving from opening 328 toward the re-entrant portion 331. The angled portion 345 of stem 340 contacts the sloped surface 329 of the cavity 314 and drives the projection 318 laterally towards the re-entrant portion 331. The angled portion 345 interacts with the sloped surface 329 to move the projection 318 into a position where the protrusion 339 may be vertically below, i.e. aligned with, the corresponding re-entrant portion 331. The protrusion 339 may then be positioned to engage behind the re-entrant portion 331 in a locked arrangement. In the locked arrangement, the abutment surface 309 and the corresponding abutment surface 307 are in engagement.

Advantageously, the interaction of angled 345 and sloped 329 surfaces can assist an operator to engage corresponding coupling portions of the mill liner and the coupling tool 316. In-use, the contact between angled 345 and sloped 329 generates resistance forces, i.e. tactile feedback, that can be sensed by an operator of the mill liner replacement machine 12'. When the operator senses this tactile feedback, it can indicate the position of the protrusion 339 relative to the re-entrant portion 331 and prompt the operator to engage the coupling portions.

Figure 24A:
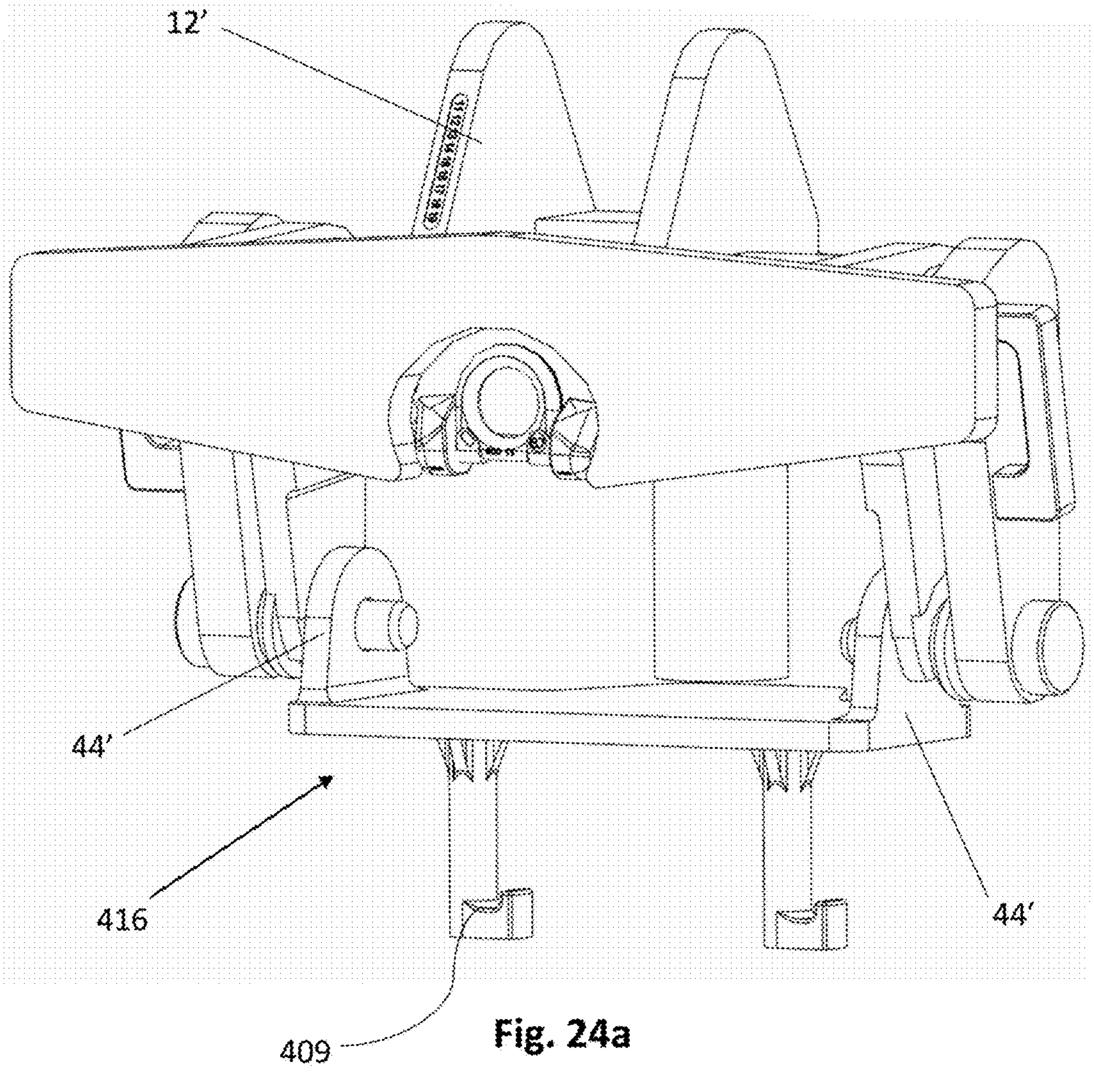
FIG. 24*a* is a perspective view of a further embodiment of a coupling tool releasably mounted to a mill liner replacement machine.
Figure 24B:
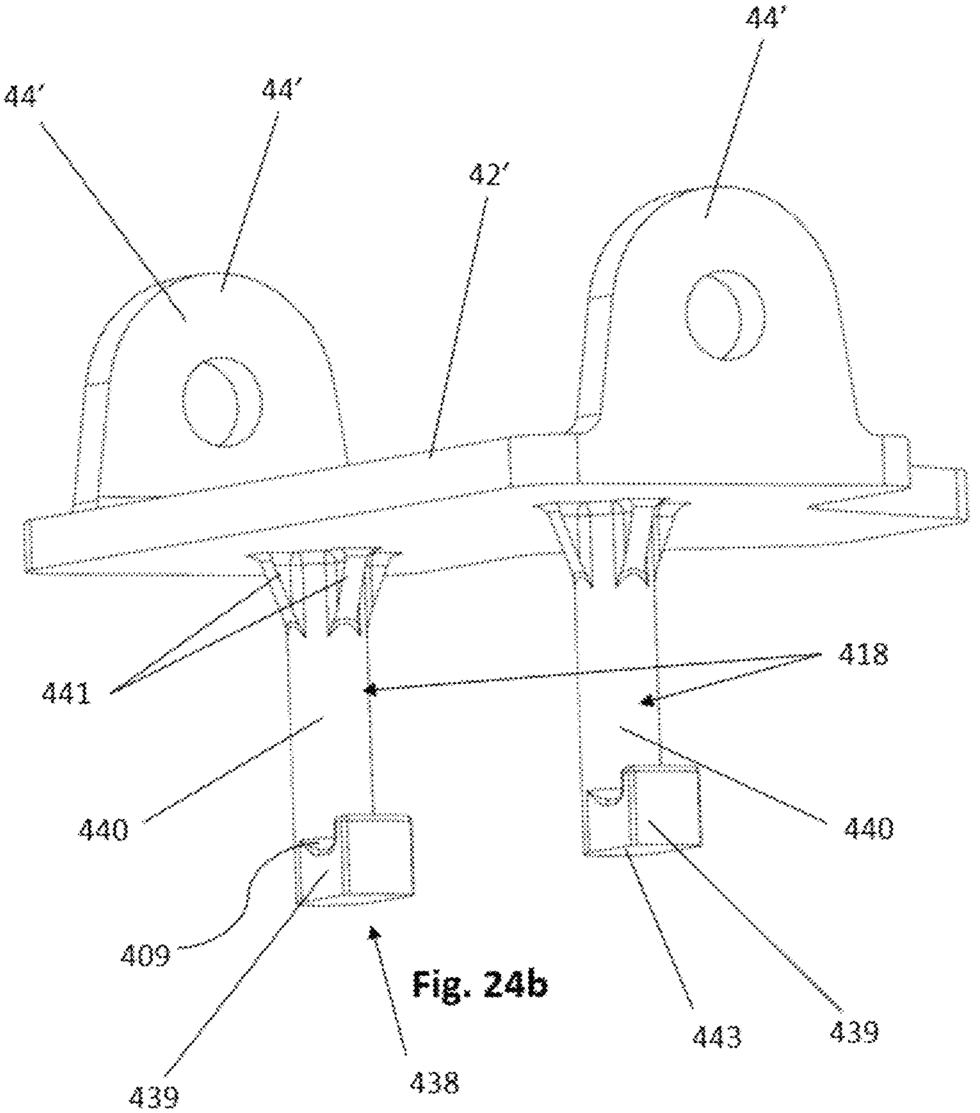
FIG. 24*b* is a perspective view of the further embodiment of a coupling tool of FIG. 24*a*.
Figure 24C:
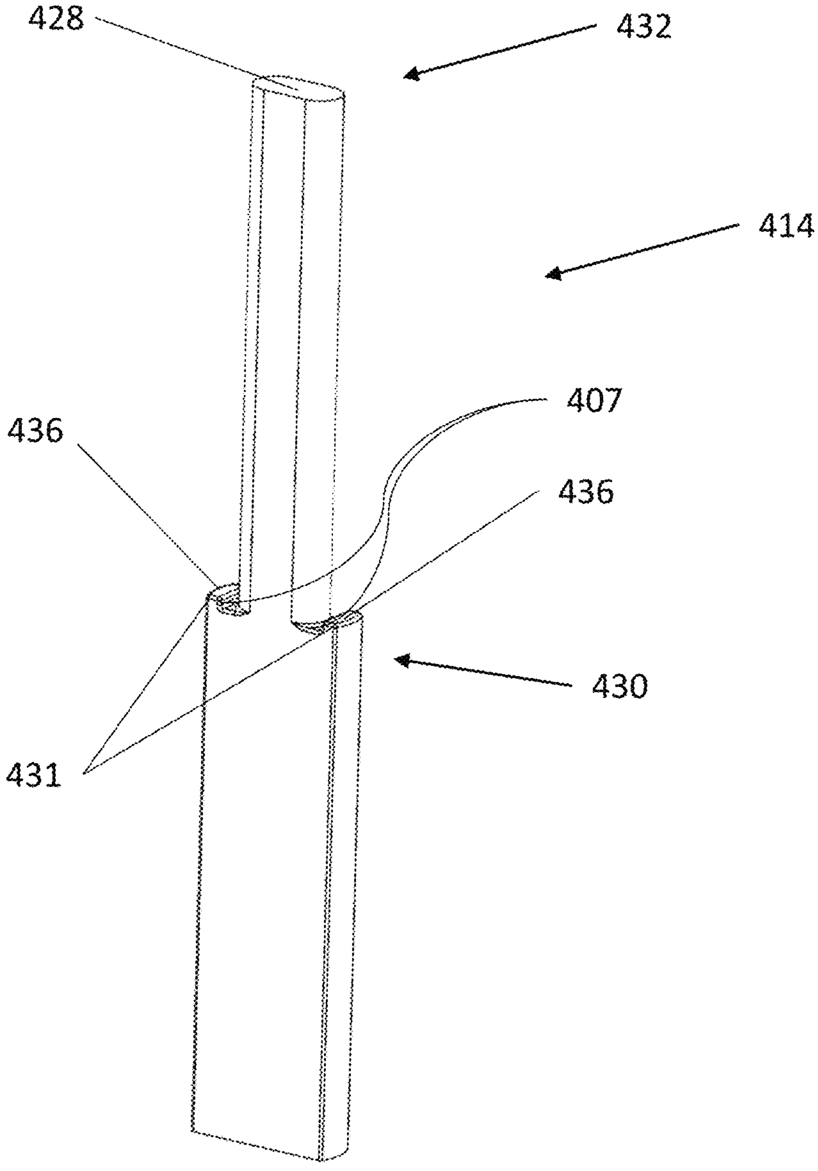
FIG. 24*c* is a perspective view of a mill liner core corresponding to the coupling tool of FIG. 24*b*.

Referring now to FIGS. 24*a*, 24*b* and 24*c*, a sixth embodiment of a coupling is shown. Referring to FIG. 24*a*, the coupling tool 416 may be assembled to the mill liner replacement machine 12' about mounting portions 44'.

Referring to FIG. 24*b*, the sixth embodiment may be substantially identical to the fourth embodiments (FIG. 22*b*). The sixth embodiment differs from the fourth, in that the protrusions 439 of the projection 418 are orientated generally perpendicular to the mounting portions 44'.

Figure 25A:
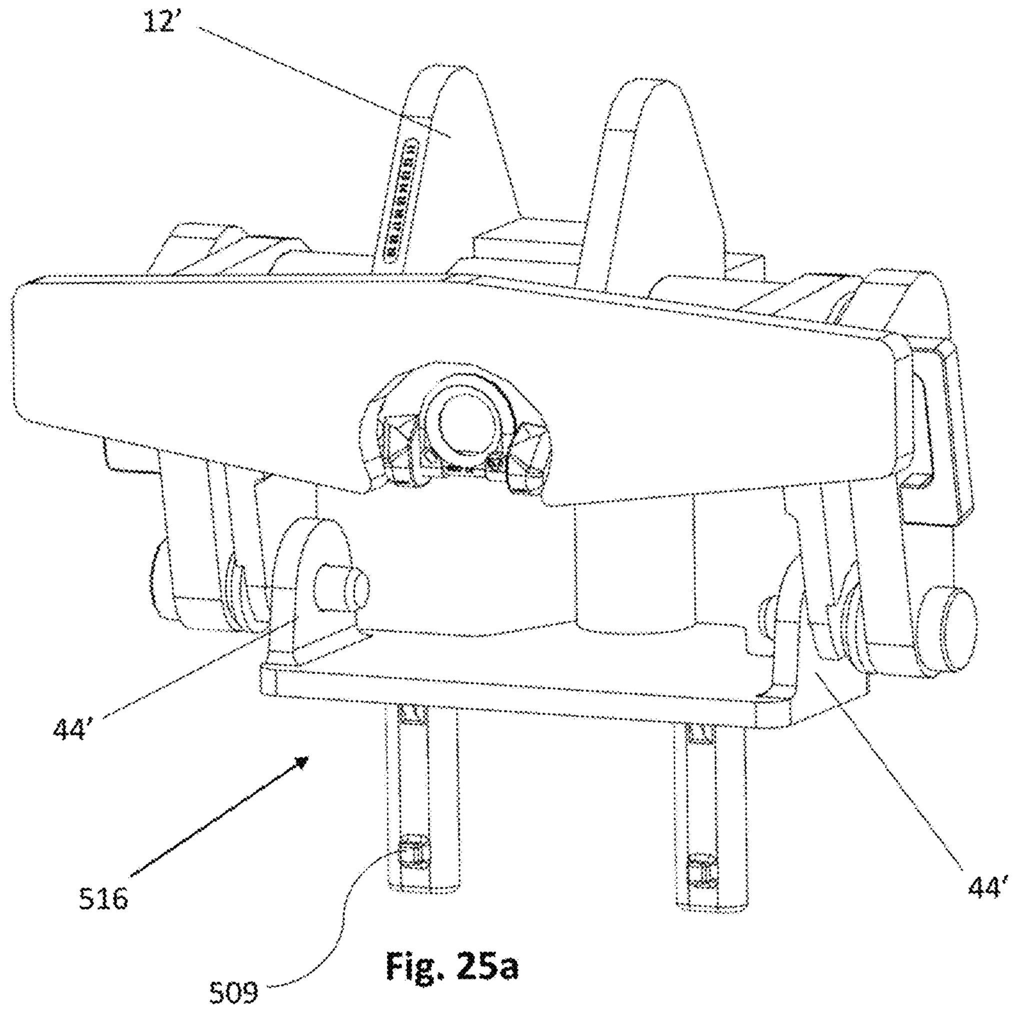
FIG. 25*a* is a perspective view of a further embodiment of a coupling tool releasably mounted to a mill liner replacement machine.
Figure 25B:
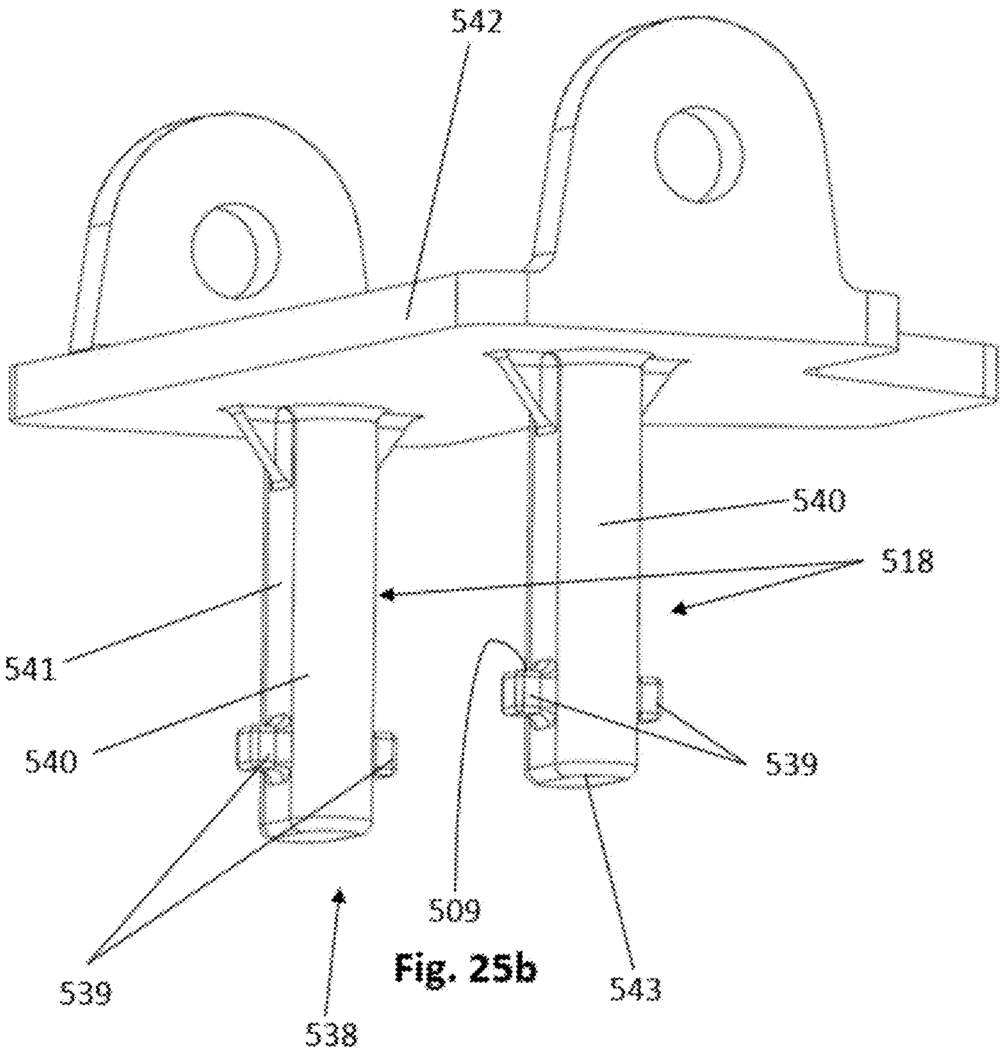
FIG. 25*b* is a perspective view of the further embodiment of a coupling tool of FIG. 25*a*.
Figure 25C:
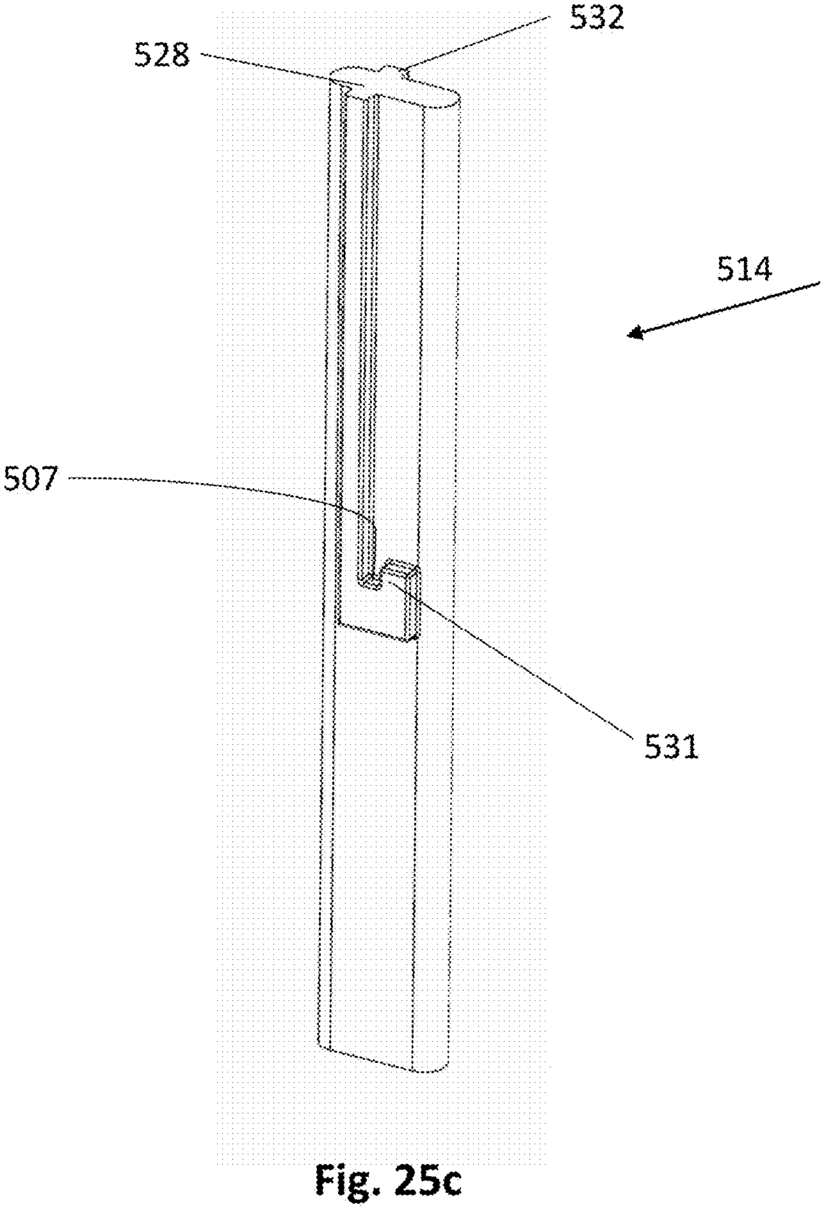
FIG. 25*c* is a perspective view of a mill liner core corresponding to the coupling tool of FIG. 25*b*.

Referring now to FIGS. 25*a*, 25*b* and 25*c*, a seventh embodiment of a coupling is shown. Referring to FIG. 25*a*, the coupling tool 516 may be assembled to the mill liner replacement machine 12' about mounting portions 44'.

Referring to FIG. 25*b*, the primary difference between the seventh embodiment and the fourth embodiment (FIGS. 22*b*) is that an enlarged head 538 of the seventh embodiment comprises two protrusions 539, offset along stem 540 towards plate 542. Further, the stems 540 of projections 518 may have substantially obround cross-sectional profiles.

Each of the two protrusions 539 may be disposed on opposing flat sides 541 of each stem 540 and positioned in alignment to each other, i.e. both positioned at equal distances from the terminal end 543. Abutment surfaces 509 are formed along a top surface of each protrusion 539 configured to engage with a corresponding abutment surface 507 formed on a wall of a corresponding cavity 514. The protrusions 539 may be integrally formed with stems 540. The stem 540 and the two protrusions 539 of each projection 518 generally form a cruciform-shape when viewed in profile.

The terminal end 543 of the projection 518 may be a flat surface orientated substantially perpendicular to stem 540.

Referring to FIG. 25*c*, a profile of the cavity 514 is shown as a solid body. The cavity 514 may have an opening 528 substantially corresponding to the cross-sectional cruciform-shape of the stem 540 and protrusion 539. Each cavity 514 may be substantially obround in shape, comprising an additional cavity portion in the form of a track 515. When projection 518 is viewed from the side, the track 515 may be a cane-shape.

The cruciform-shape of the opening 528 may be designed to allow the coupling tool 516 to enter the cavity 514 via the top 532 of the track 515. The protrusions 539 are designed to be guided through the track 515 by the corresponding internal surfaces. The protrusions 539 may be captured behind re-entrant portion 531 of track 515 to set the projections 518 in a locked position with the mill liner. In the locked position the abutment surfaces 509, 507 are engaged.

Figure 26A:
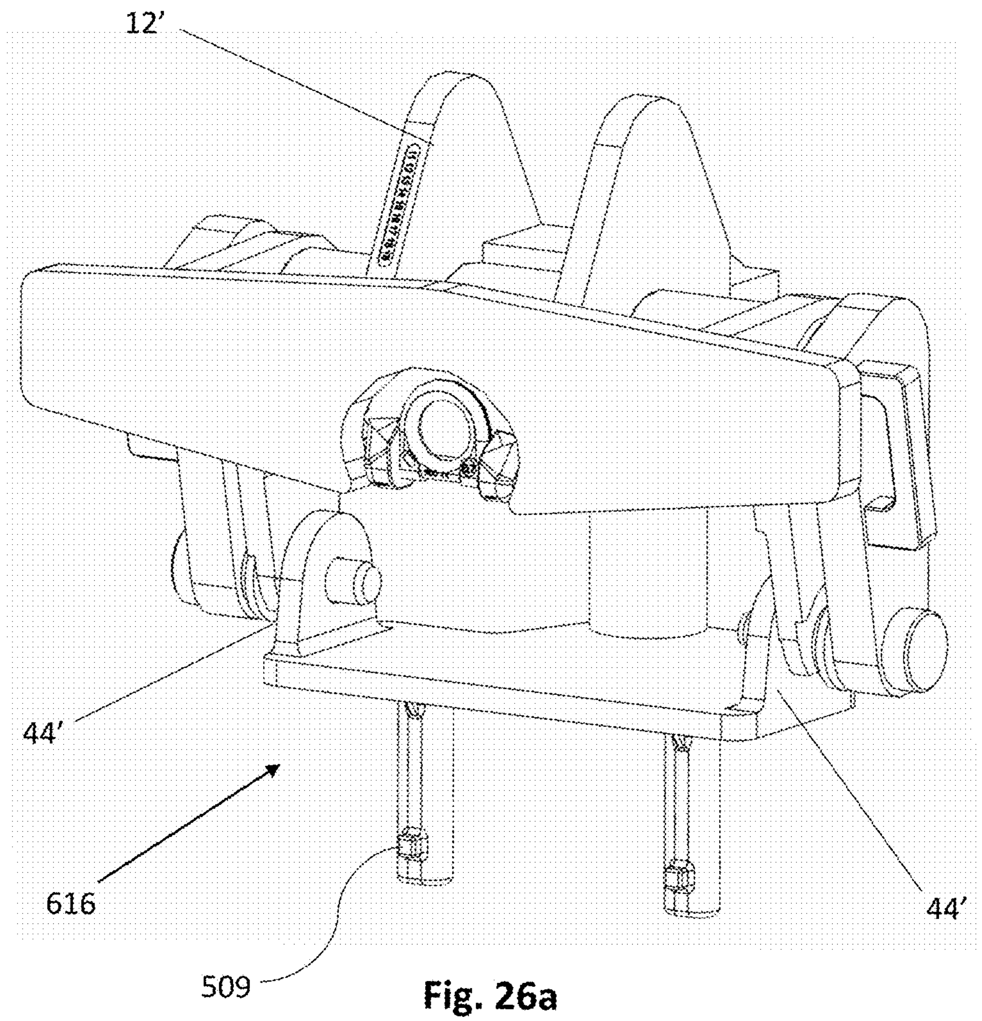
FIG. 26*a* is a perspective view of a further embodiment of a coupling tool releasably mounted to a mill liner replacement machine.
Figure 26B:
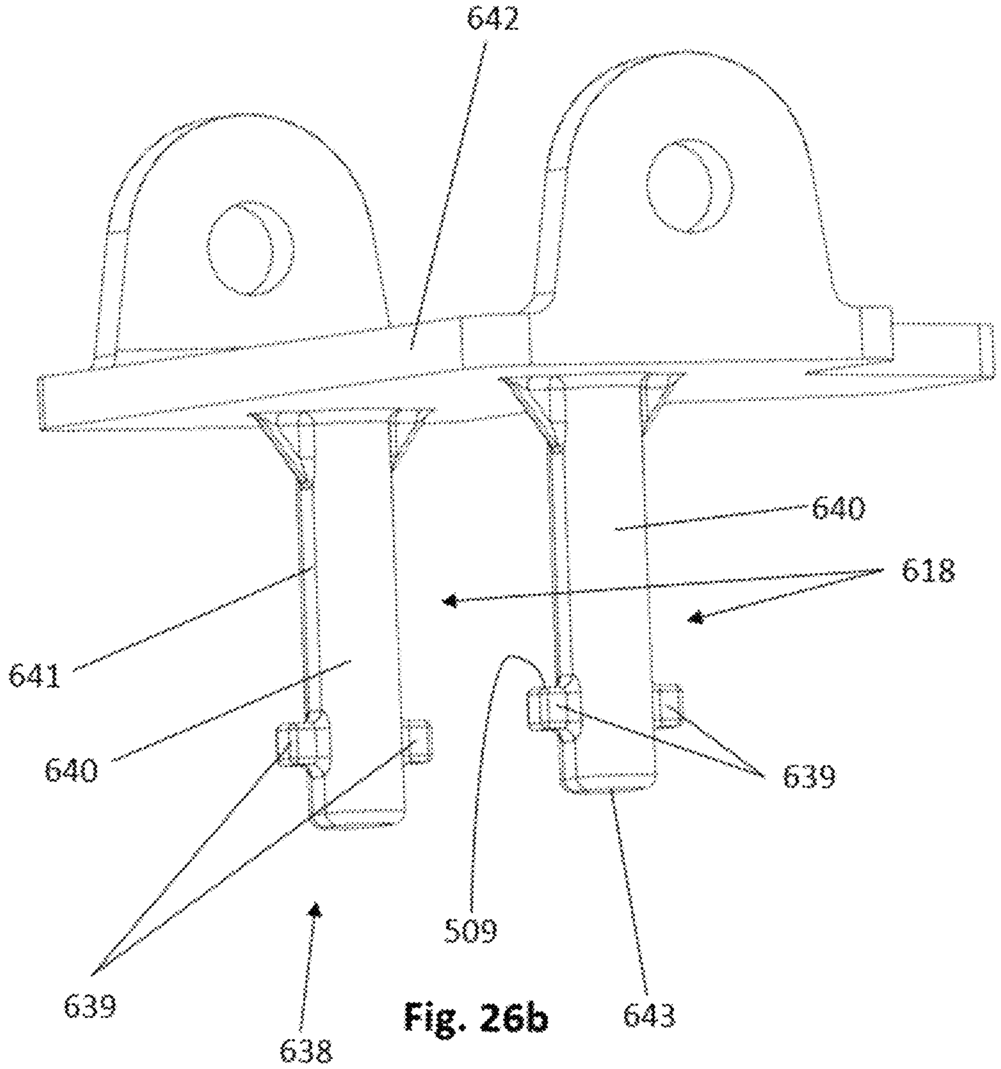
FIG. 26*b* is a perspective view of the further embodiment of a coupling tool of FIG. 26*a*.
Figure 26C:
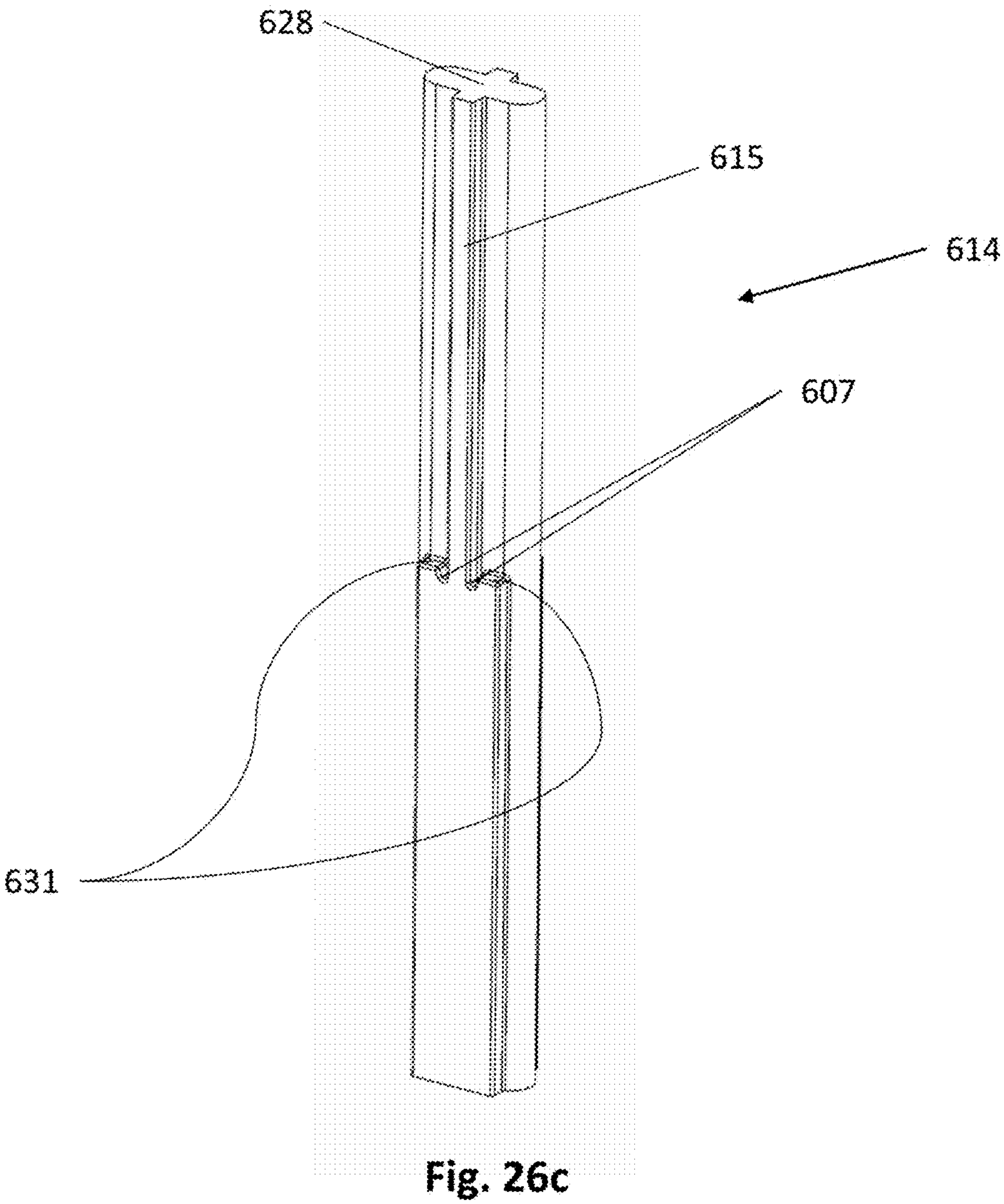
FIG. 26*c* is a perspective view of a mill liner core corresponding to the coupling tool of FIG. 26*b*.

Referring now to FIGS. 26*a*, 26*b* and 26*c*, an eighth embodiment of a coupling is shown. Referring to FIG. 26*a*, the coupling tool 616 may be assembled to the mill liner replacement machine 12' about mounting portions 44'.

Referring to FIG. 26*c*, the eighth embodiment primarily differs from the seventh embodiment (FIG. 25*b*) in that cavity 614 comprises two re-entrant portions 631, each disposed in a mirror image relation opposite to each other. The cavity 614, when viewed from a side, i.e. a plane normal to the top view, includes two re-entrant portions 631 together forming a track 615 in the form of an anchor-shape. Advantageously, projections 618 can connect with either one of re-entrant portions 631. In other words, the coupling tool 616 may be bidirectional and orientated to align with either re-entrant portion 631 of the cavity 614.

Figure 27A:
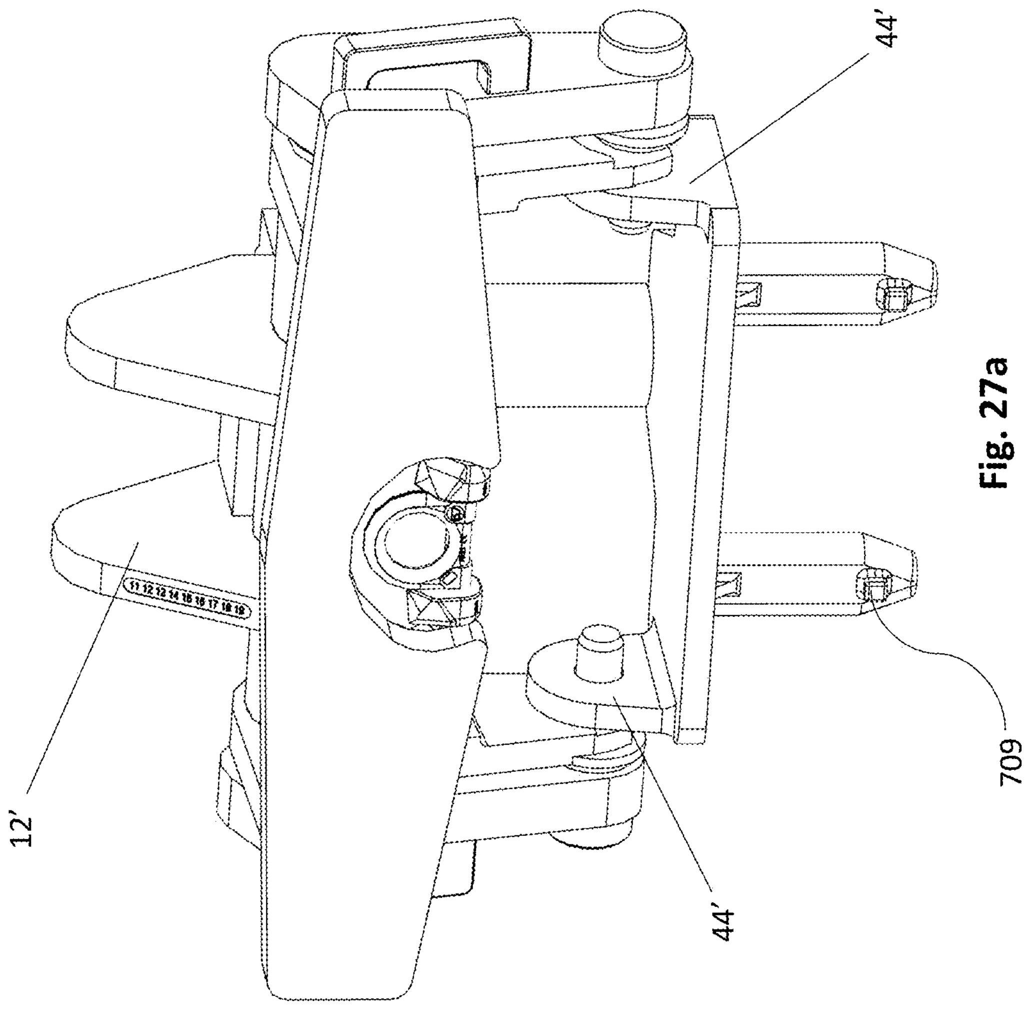
FIG. 27*a* is a perspective view of a further embodiment of a coupling tool releasably mounted to a mill liner replacement machine.
Figure 27B:
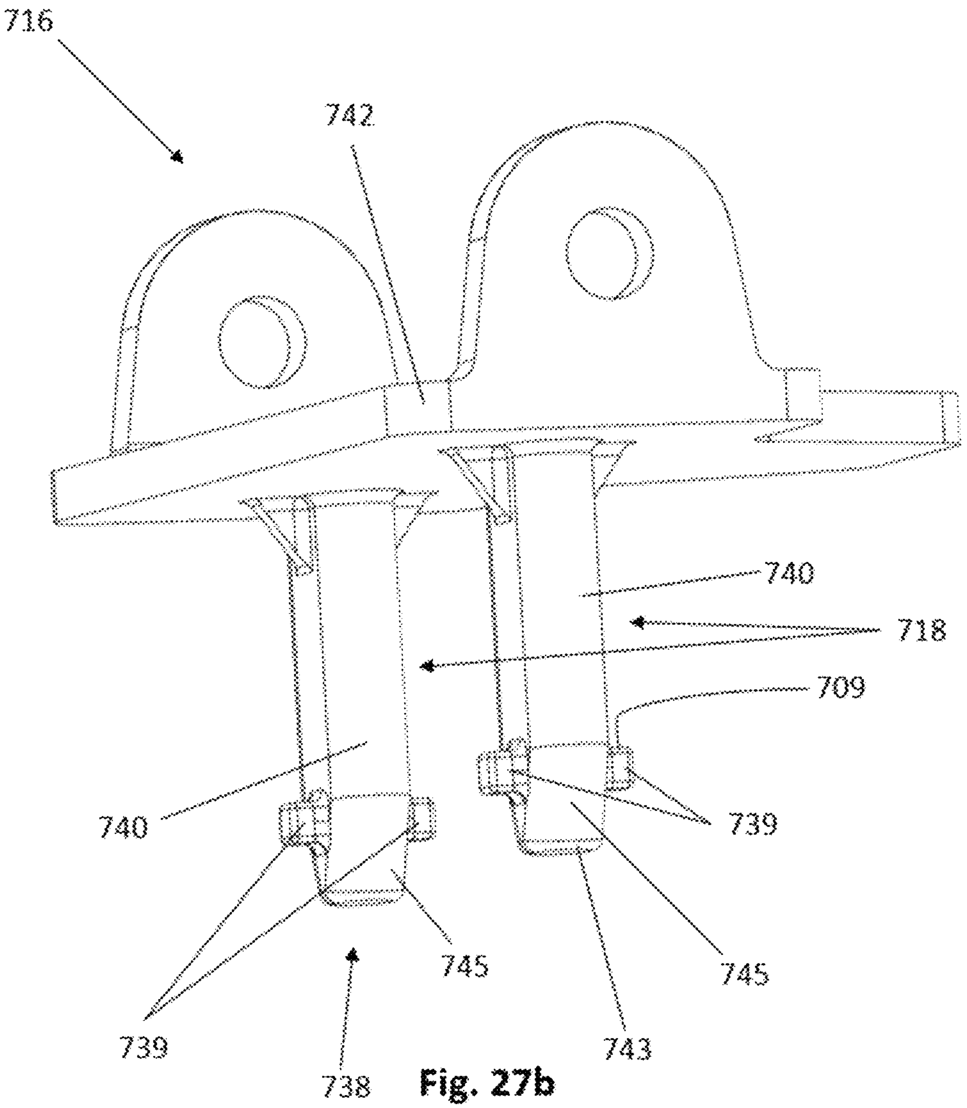
FIG. 27*b* is a perspective view of the further embodiment of a coupling tool of FIG. 27*a*.
Figure 27C:
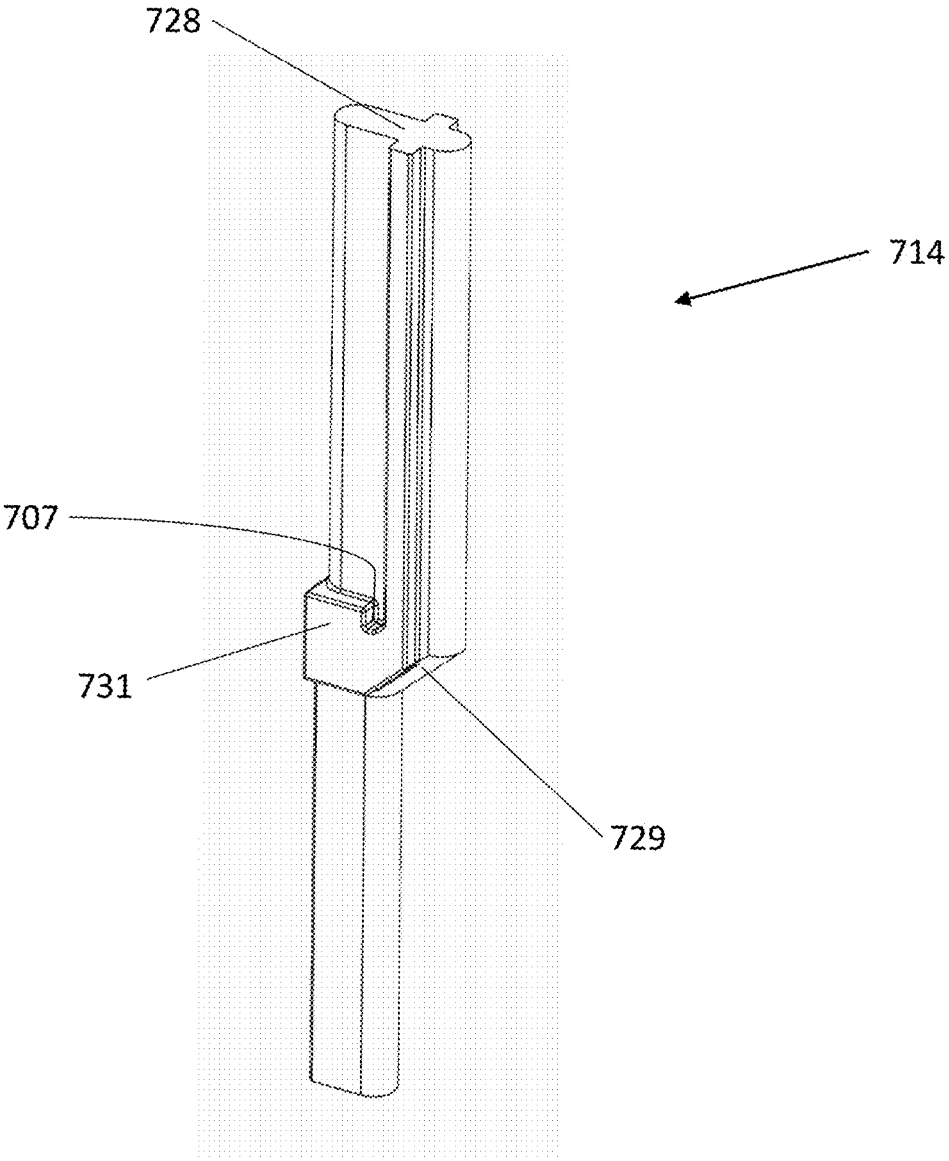
FIG. 27*c* is a perspective view of a mill liner core corresponding to the coupling tool of FIG. 27*b*.

Referring now to FIGS. 27*a*, 27*b* and 27*c*, a ninth embodiments of a coupling is shown. Referring to FIG. 27*a*, the coupling tool 716 may be assembled to the mill liner replacement machine 12' about mounting portions 44'.

Referring to FIG. 27*b*, the ninth embodiment may be similar to the seventh embodiment (FIG. 25*b*). The ninth embodiment differs from the seventh embodiment at the terminal ends 743 of the projections 718, where a portion of stems 740, proximal to the terminal ends 743, may comprise angled portions 745, i.e. a chamfer or bevel. When stem 740 has an obround-shaped, cross-sectional profile, the stem 740 tapers along the angled portions 745 and they converge at the terminal end 743. In the illustrated embodiment, they converge to form a line, but they may converge to form a point or a small area relative to the size of the stem. The angled portions 745 may be located on opposing rounded sides of the stem 740. In the embodiment shown in FIG. 27*b*, the angled portion 745 extends to a point approximately in-line with the protrusions 739. Advantageously, the terminal end 743 of stem 740 may be the narrowest portion of the projection 718 and may assist an operator to align and insert the projection 718 within the relatively larger opening 728 of cavity 714 (shown in FIG. 27*c*).

Referring to FIG. 27*c*, a profile of cavity 714 is shown as a solid body. Each cavity 714 may be similar to the seventh embodiment (FIG. 25*b*) and primarily differs in that the surface vertically opposite the re-entrant portion 731 comprises a sloped surface 729 with an angle corresponding substantially with the angled portion 745 of projection 718.

The projections 718, in-use, are guided through the cavity 714, in a direction moving from opening 728 toward the re-entrant portion 731. The angled portion 745 of stem 740 may be designed to contact the sloped surface 729 of cavity 714 and drive the projection 718 laterally towards the re-entrant portion 731. The portion 745 interacts with the sloped surface 729 to move the projection 718 into a position where the protrusions 739 are vertically below, i.e. aligned with, the corresponding re-entrant portion 731. The protrusions 739 are then positioned to engage behind the re-entrant portion 731 in a locked arrangement. Corresponding abutment surfaces 709, 707 are formed on the projections and the internal wall of the cavity defining the re-entrant portions 731 and are configured to engage in the locked arrangement.

Advantageously, and as described previously in the fifth of the further embodiments (FIG. 23*b*), the interaction of angled portion 745 and sloped surface 729 can assist an operator to engage corresponding coupling portions of the mill liner and the coupling tool 716. In-use, the contact between the angled 745 and the sloped 729 generates tactile feedback that can be sensed by an operator and indicate the relative positions of the protrusion 739 and the re-entrant portion 731.

Figure 28A:
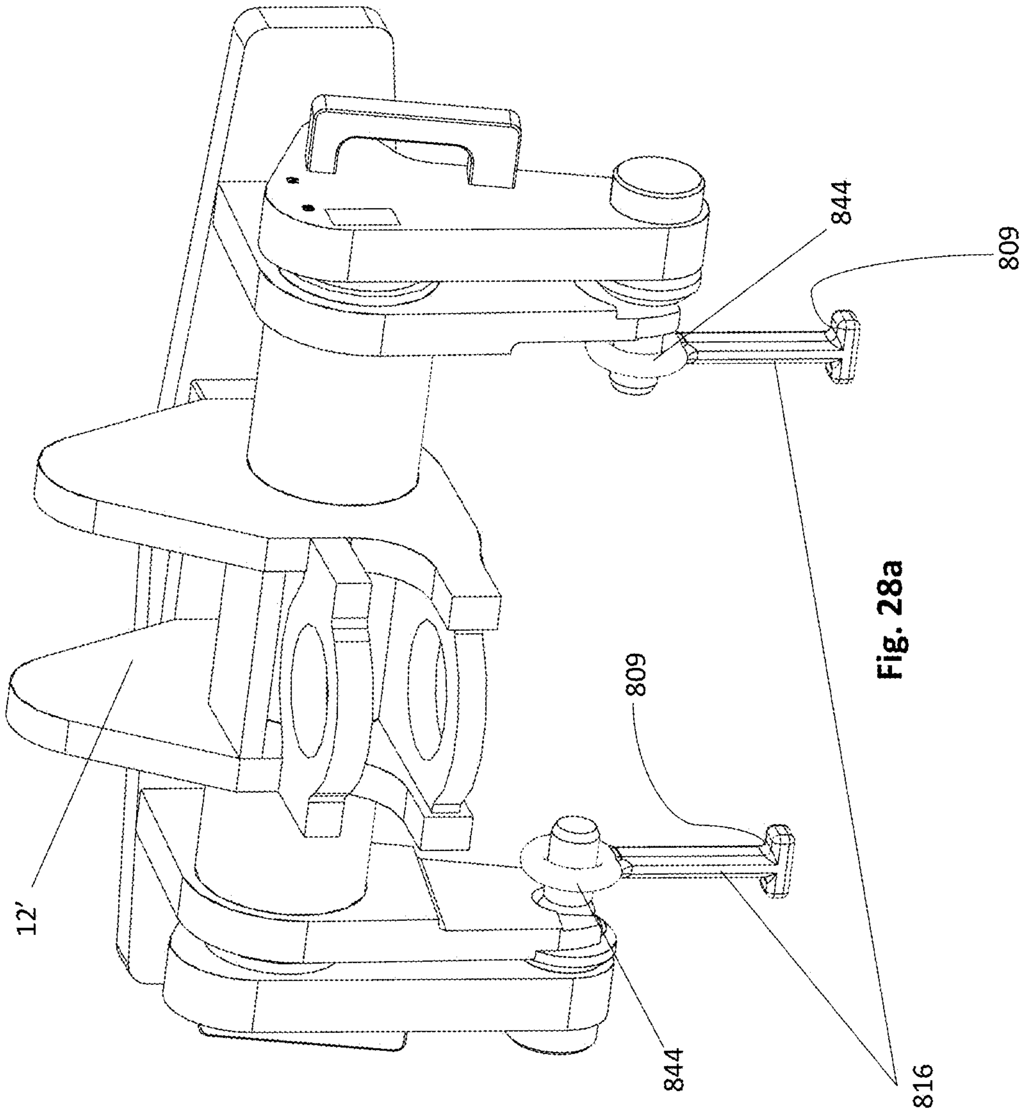
FIG. 28*a* is a perspective view of a further embodiment of a coupling tool releasably mounted to a mill liner replacement machine.
Figure 28C:
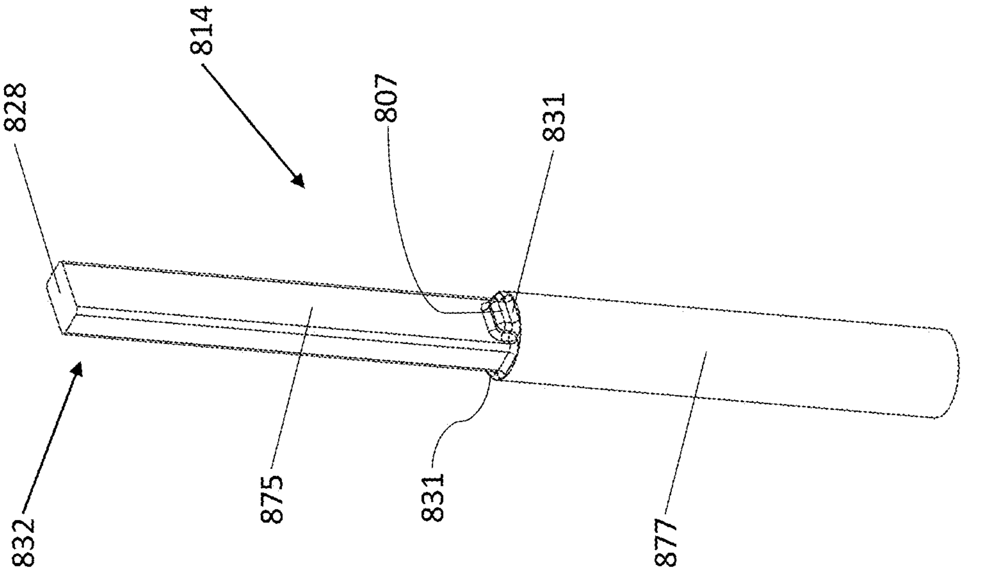
FIG. 28*c* is a perspective view of a mill liner core corresponding to the coupling tool of FIG. 28*b*.
Figure 28B:
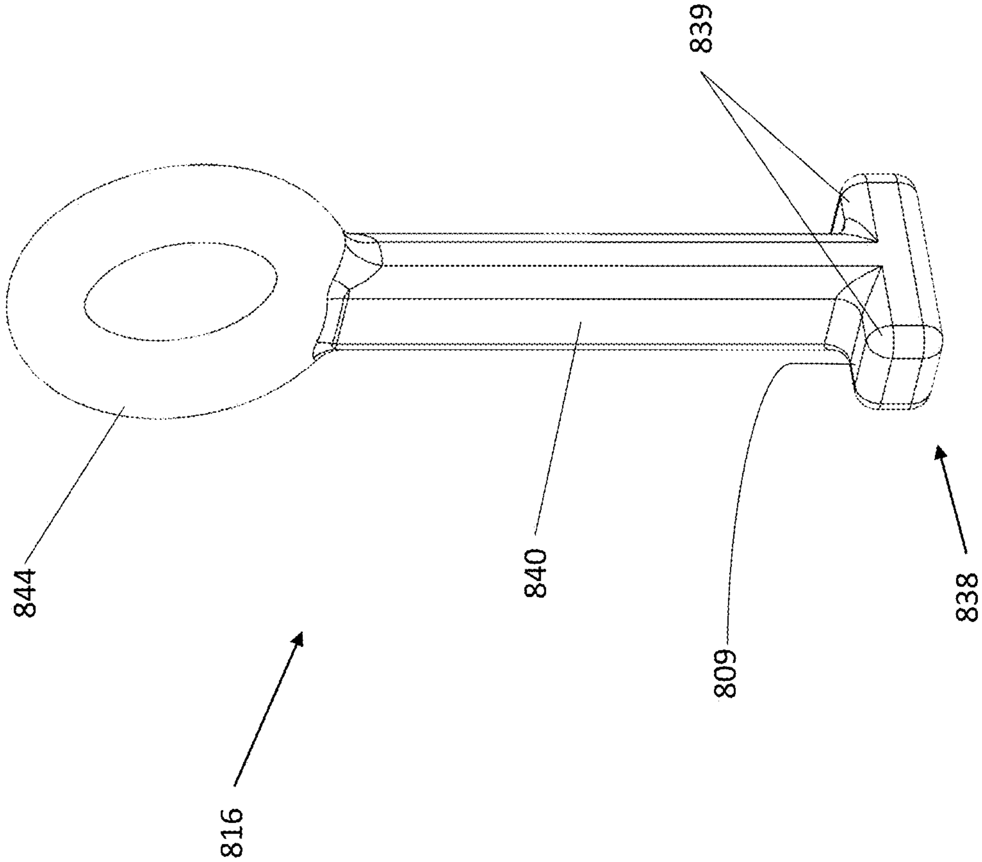
FIG. 28*b* is a perspective view of the further embodiment of a coupling tool of FIG. 28*a*.

Referring now to FIGS. 28*a*, 28*b* and 28*c*, a tenth embodiment of a coupling is shown. Referring to FIG. 28*a*, the coupling tool comprises two independently movable coupling tools 816, assembled to the mill liner replacement machine 12' about mounting portions 844.

Referring to FIG. 28*b*, the tenth embodiment primarily differs from the previously disclosed embodiments of FIGS. 22 to 27, in that the coupling tools 816 are not joined together by a plate (not shown). In this way, coupling tools 816 can move independently of each other, which has advantages that will be described in more detail below.

Each of the two coupling tools 816 comprise a mounting portion 844 at a first end, an enlarged head portion 838 at an opposing second end, and a stem 840 extending therebetween. The stem 840 may be a rectangular prism and may be integrally formed with both mounting 844 and head 838.

The mounting portion 844 of each coupling tool 816 may be in the form of a ring-shape, e.g. an eyelet, wherein an inner diameter of the ring-shape may be configured to mount around a complimentary pin disposed in mill liner replacement machine 12'.

The enlarged head portion 838 comprises two protrusions 839 extending laterally from opposing sides of the stem 840. In the embodiment shown in FIG. 28*b*, the head portion 838 may have a generally rectangular-prismed shape forming a T-shape with stem 840.

Referring to FIG. 28*c*, a profile of cavity 814 is shown as a solid body. The cavity 814, when viewed from the top 832, includes an opening 828 that may be a rectangular shape. The cavity 814 comprises two elongate portions, an outer portion 875 and an inner portion 877. The outer portion 875 may be a rectangular prismed shape, corresponding to the cross-sectional profile of the enlarged head portion 838. The inner portion 877 is enlarged relative to the outer portion 875, and in the illustrated embodiment is cylindrical in shape. Two re-entrant portions 831 may be disposed in a mirror image relation, i.e. the two portions 831 are positioned on opposing sides of the outer portion 875 and located at a junction between outer and inner portions 875, 877. The re-entrant portions 831 are orientated such that a cross-sectional of cavity 814, taken through the re-entrant portions 831, has a cruciform-profile.

The projections 816, in-use, are guided through the cavity 814, in a direction from the outer portion 875 toward the inner portion 877. The protrusions 839 are designed to be guided through the outer portion 875 by the corresponding internal surfaces. In-use, the contact between the enlarged head 838 and outer portion 875 generates resistance forces, i.e. tactile feedback, that can be sensed by an operator of the mill liner replacement machine 12'. When the enlarged head enters the inner portion 877, the internal surfaces of the cylindrical shape of the inner portion do not impart resistance forces to the coupling tools 816. The operator can receive this tactile feedback, and it may indicate the position of the protrusions 839 relative to the re-entrant portion 831 and prompt the operator to engage the coupling portions.

When the enlarged head enters the inner portion 877, the coupling tool 816 can be rotated (clockwise or counter-clockwise) through approximately ninety-degrees about the stem 840 to align the protrusions 839 with complimentary re-entrant portions 831. The protrusions 839 are then positioned to engage behind the re-entrant portion 831 in a locked arrangement. Corresponding abutment surfaces 809, 807 are formed on the projections and the internal wall of the cavity defining the re-entrant portions 831 and are configured to engage in the locked arrangement.

Advantageously, the projections 818 can be engaged behind the re-entrant portions 831 by rotating the projections ninety-degrees in either a clockwise or counter-clockwise direction. Enabling bi-directional engagement simplifies the coupling process.

In-use, two coupling tools 816 are arranged in a locked position within cavities 814 and then mounted to pins 879 on the mill liner replacement machine 12' about respective mounting portions 844. The coupling tools 816 may be moveable in relation to the pins 879 or fixed in relation to the pins 879 depending on the needs of the operator.

Figure 29A:
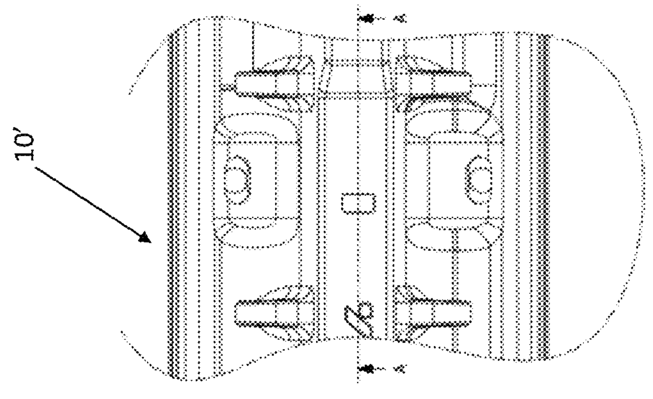
FIG. 29*a* is a plan view of an embodiment of a coupling component of a mill liner including an unworn plug.
Figure 29B:
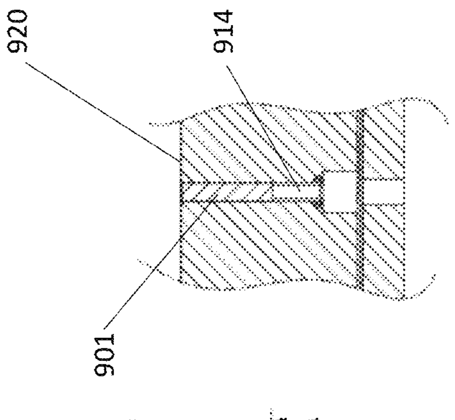
FIG. 29*b* is a cross-sectional view of the mill liner of FIG. 29*a* along the line A-A.
Figure 30A:
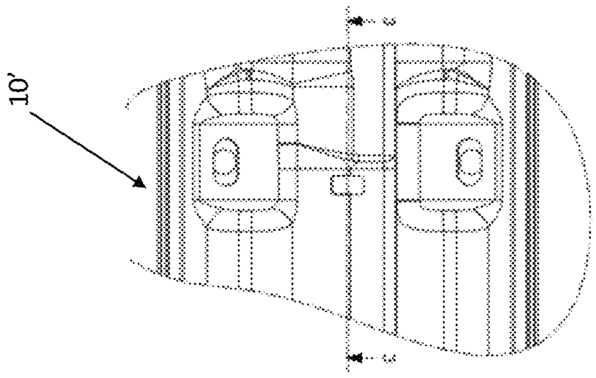
FIG. 30*a* is a plan view of an embodiment of a coupling component of a mill liner including a worn plug.
Figure 30B:
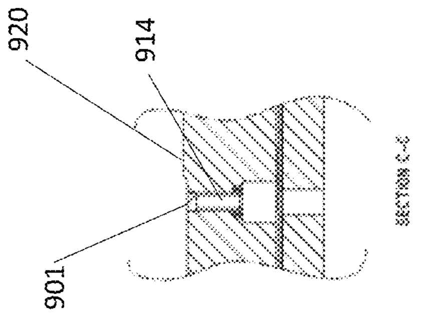
FIG. 30*b* is a cross-sectional view of the mill liner of FIG. 30*a* along the line C-C.
Figure 31B:
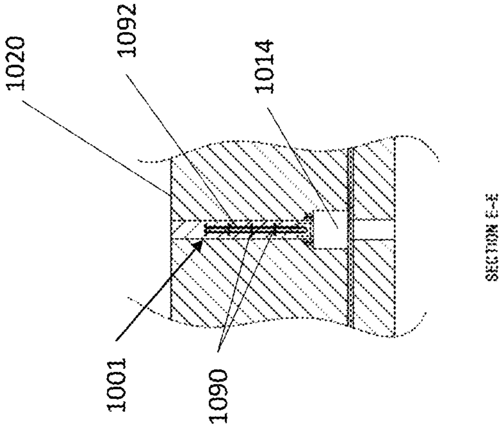
FIG. 31*b* is a cross-sectional view of the mill liner of FIG. 31*a* along the line E-E.
Figure 31A:
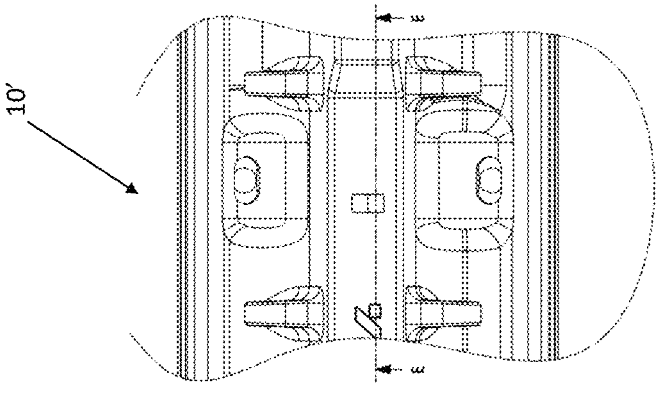
FIG. 31*a* is a plan view of a further embodiment of a coupling component of a mill liner including an unworn plug.

Referring to FIGS. 29 to 31. A further alternative embodiment of a mill liner is disclosed that may include a plug 901 configured to seal a coupling component in the form of a cavity 914. The cavity 914 may be accessible for coupling to a coupling tool after a wear surface 920 is worn. The plug may be configured wear away with the liner, the plug may be configured to disengage when the liner is worn or the plug may be configured to be removed by an operator to access the cavity 914 during removal of the worn mill liner. Any embodiment of suitable plug may be employed.

Referring now to FIGS. 29 to 30. The plug 901 is disposed within cavity 914 to prevent fines build up within the cavity 914 during operation. Fines build up may include, but is not limited to, processed mineral ores, chemical products and coal particulates.

The plug 901 may be comprised of a settable material cast within the cavity 914 of mill liner 10'. The material may be selected according to their capacity to wear away as the mill liner wear surface is worn down. Examples of possible settable materials to form the plug 901 include, rubber, hardened resin, Sikaflex™, Expandafoam™, and crushable foams or urethanes.

Referring to FIG. 29*b*, the plug 901 may be comprised of a discrete volume of material located proximal to the wear surface 920 of the mill liner 10'. As such, a portion of the cavity 914 is occupied by the plug 901. In this way, the cavity 914 is only visible and accessible once the liner has been worn down past the plug portion 901 during operation of the grinding mill. Referring to FIG. 30*b*, as the wear surface 920 is worn down, the plug 901 is correspondingly worn down. Advantageously, this arrangement may provide a practical wear indicator notifying operators when the mill liner needs to be replaced.

The plug 901 may be removed manually if the mill liner is not worn to a point where the plug 901 is removed from the cavity 914. Any remaining portion of plug 901 may be removed from the cavity 914 by an operator accessing the wear surface 920 from within the mill. Alternatively, the use of crushable foams or urethanes to form the plug 901 may permit projections of a coupling tool to enter the corresponding cavities 914 of the mill liner and crush the plug 901. Following removal of the plug 901 from the cavity 914, complementary projection can be inserted as to form the coupling to the mill liner. Alternatively, a plug that is configured to self-disengage when the liner is worn may also be included.

Figure 32B:
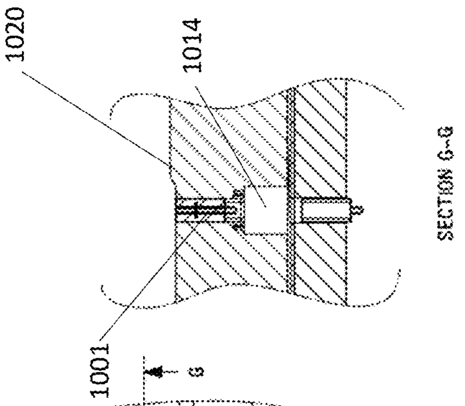
FIG. 32*b* is a cross-sectional view of the mill liner of FIG. 32*a* along the line G-G.
Figure 32A:
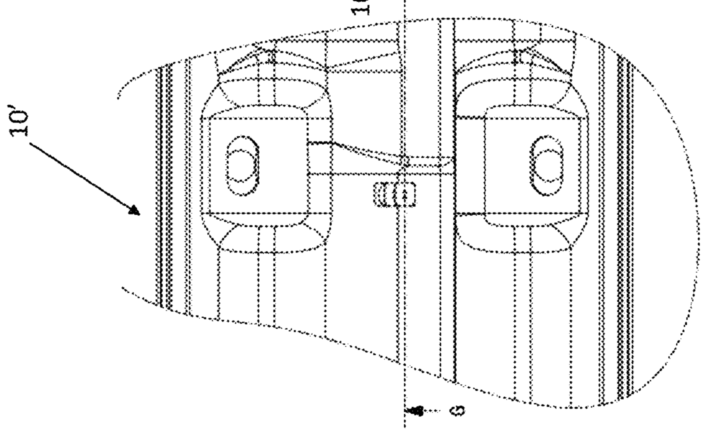
FIG. 32*a* is a plan view of a further embodiment of a coupling component of a mill liner including a worn plug.

Referring now to FIGS. 31 to 32. The plug 1001 may be comprised of a pre-formed plug. The plug 1001 may be shaped to fit within the cavity 1014 of mill liner 10' and form a sealed interface around the internal surfaces of cavity 1014 to prevent fines entering.

Referring to the embodiment shown in FIG. 31*b*, the plug 1001 may comprise a series of ribs 1090 spaced along a central chord 1092. The ribs may each form a seal against the adjacent internal surface of cavity 1014. The series of ribs ensures that as the plug 1001 is worn down, a seal is maintained around the internal surfaces of cavity 1014. Referring to FIG. 32*b*, the wear surface is shown in a worn state, wherein the plug 1001 has equally worn. Advantageously, this arrangement of ribs may provide a practical wear indicator notifying operators when the mill liner 10' needs to be replaced.

Alternatively, the plug 1001 may be used in combination with a settable material to fill a portion of cavity 1014. Advantageously, utilising both materials can improve the retention of plug 1001 within cavity 1014 during operation of the grinding mill.

Figure 33A:
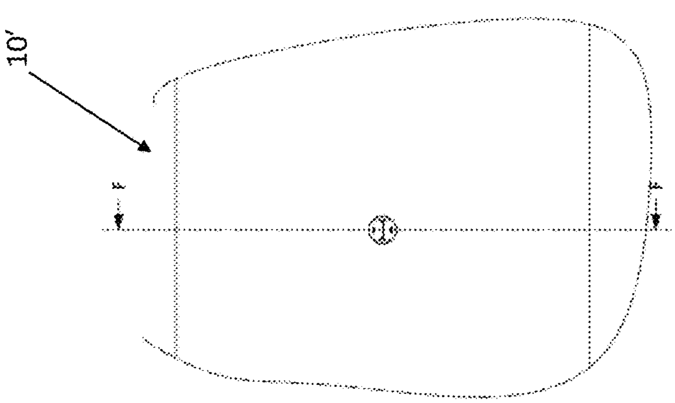
FIG. 33*a* is a plan view of a further embodiment of a coupling component of a mill liner including an unworn plug.
Figure 33B:
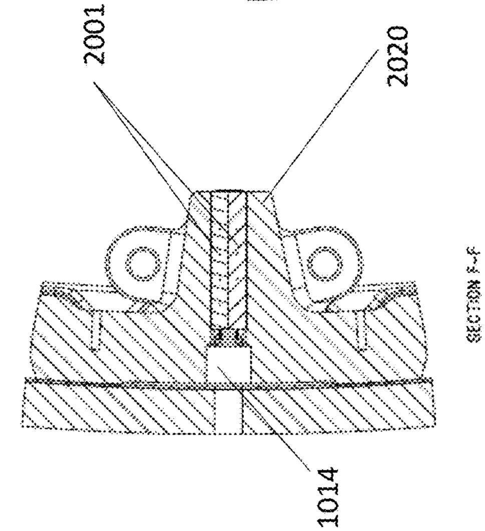
FIG. 33*b* is a cross-sectional view of the mill liner of FIG. 33*a* along the line F-F.
Figure 34A:
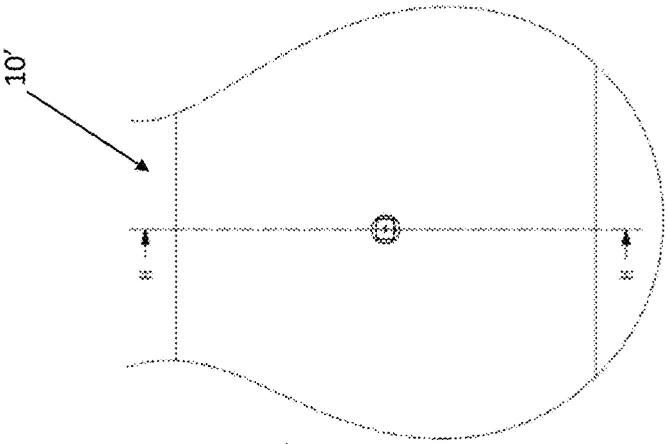
FIG. 34*a* is a plan view of a further embodiment of a coupling component of a mill liner including a worn plug.
Figure 34B:
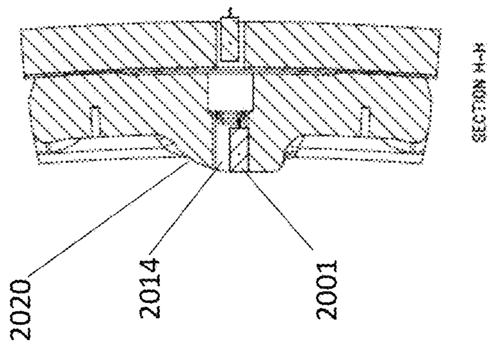
FIG. 34*b* is a cross-sectional view of the mill liner of FIG. 34*a* along the line H-H.

Further, and as shown FIGS. 33 to 34, the plug 2001 may be comprised of two elements. Advantageously, utilising two elements for plug 2001 may improve the ease of removal when plug 2001 incompletely wears before mill liner 10' requires removal. In one form, the two elements can be settable materials. In another form, the two elements can be pre-formed. In a further form, the two elements can be different material. Advantageously, one of the two elements can be optimised for ease of removal, i.e. a soft material. The second of the two elements may be a more robust material, i.e. a longer wearing material.

Figure 35B:
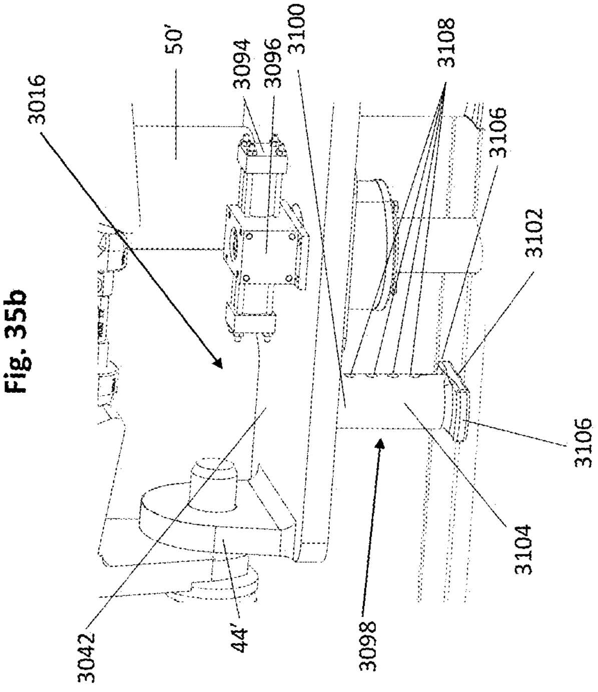
FIG. 35*b* is a perspective view of a further embodiment of the coupling tool of FIG. 35*a*.
Figure 35A:
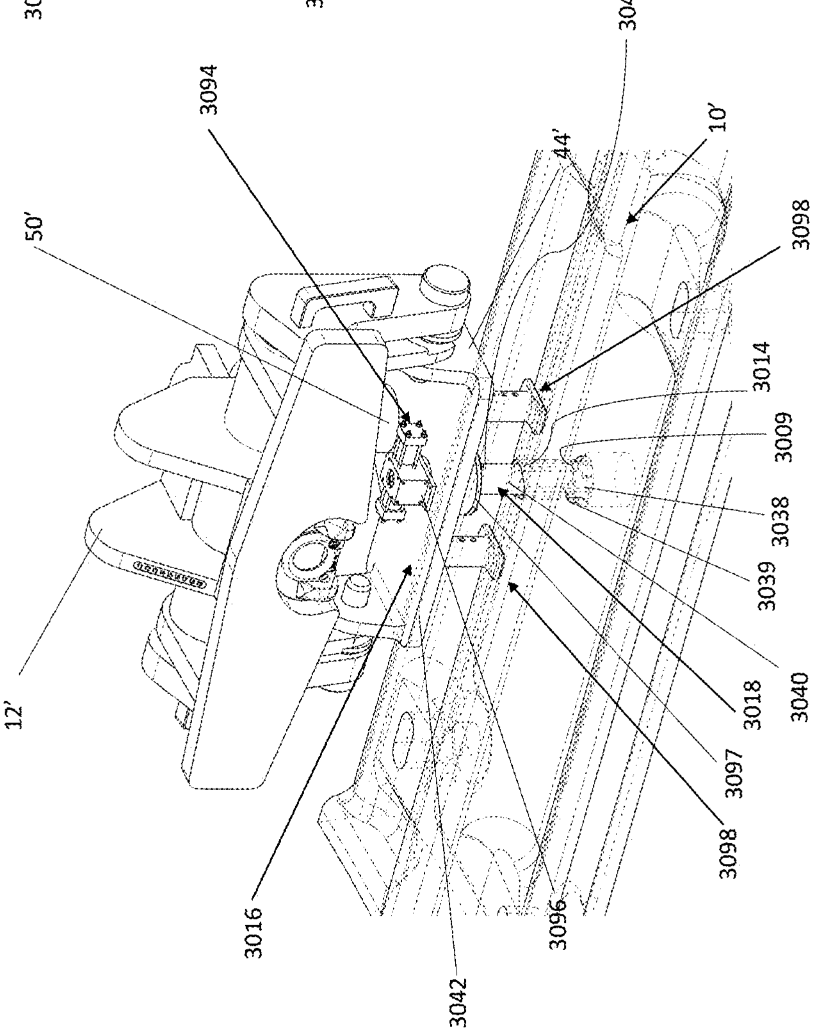
FIG. 35*a* is a perspective view of a further embodiment of a coupling tool releasably mounted to a mill liner replacement machine.
Figure 37:
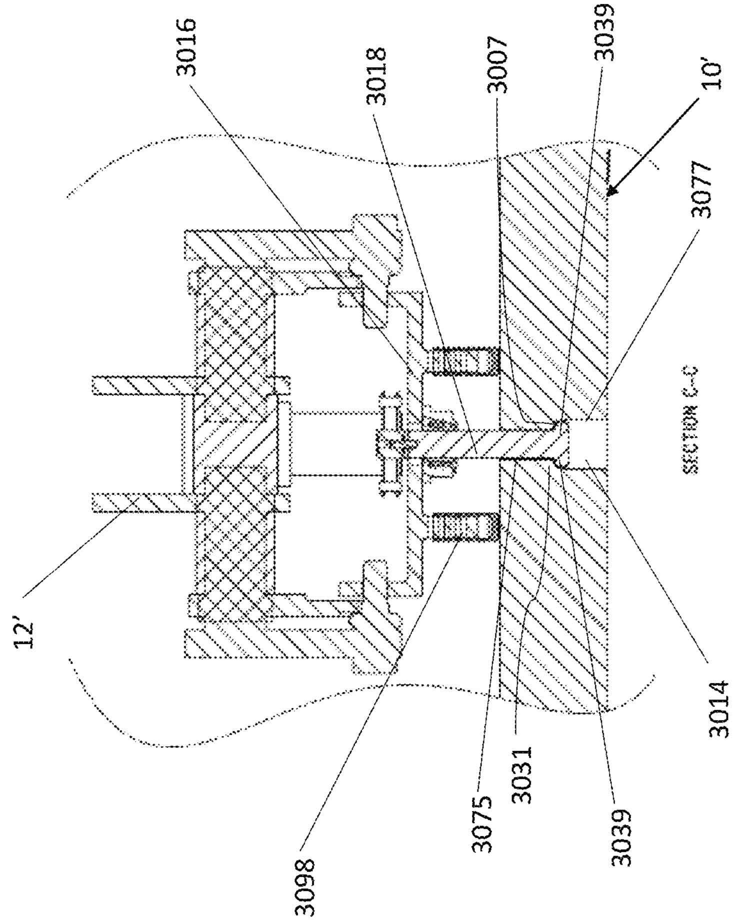
FIG. 37 is a cross-sectional view of the mill liner and coupling tool of FIG. 36 along the line C-C.
Figure 36:
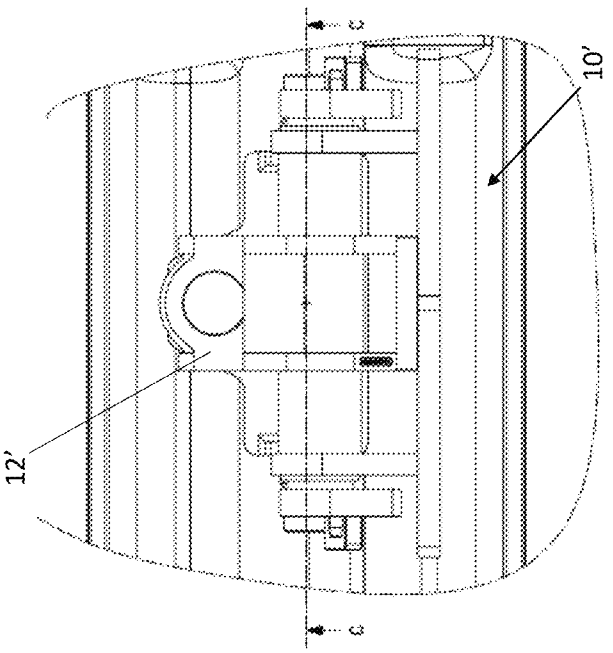
FIG. 36 is a plan view of a further embodiment of a coupling tool releasably mounted to a mill liner replacement machine.

An eleventh embodiment of a coupling is disclosed in FIGS. 35 to 37. The same reference numerals are used for like features. The primary difference between the first embodiment of the coupling (FIGS. 1 to 11) and the eleventh embodiment of the coupling disclosed in FIGS. 35 to 37, is the actuated projection assembly 3094 and two footing projections 3098 on each coupling tool. Additionally, the actuated projection 3094 of the further alternative embodiment discloses an alternatively shaped projection disposed on the coupling tool to correspond with complimentary cavities in a mill liner 10'. The eleventh embodiment of a coupling will now be described.

Referring now to FIG. 35*a*, the eleventh embodiment of a coupling is shown. The coupling tool 3016 may be assembled to the mill liner replacement machine 12' about mounting portions 44'. The actuated projection assembly 3094 may be fixed to plate 3042 and comprises an actuator mechanism 3096, a bearing assembly 3097 and the actuated projection 3018 mounted thereto. The two footing projections 3098 are moveable and may be mounted to plate 3042. The footing projections 3098 may be located between the actuated projection assembly 3094 and a reaction foot 50' as to balance the mill liner 10' during coupling.

The actuator mechanism 3096 of actuated projection assembly 3094 is configured to rotate an actuated projection 3018 into engagement with the corresponding cavity 3014 in the mill liner 10'. The actuation mechanism 3096 may comprise a powered actuation mechanism such as an electric motor that can be actuated to rotate the actuated projection 3094 either clockwise or counter-clockwise.

The coupling tool 3016 comprises an actuated portion 3044 at a first end, an enlarged head portion 3038 at an opposing second end, and a stem 3040 extending therebetween. The stem 3040 may be cylindrical and may be integrally formed with both the actuated portion 3044 and the head 3038. The actuated portion 3044 may be configured to engage and rotate within the actuation mechanism 3096.

The enlarged head portion 3038 comprises two protrusions 3039 extending laterally from two opposing sides of stem 3040. In the embodiment shown in FIG. 35*a*, the head portion 3038 may forms a T-shape with stem 3040.

The cavity 3014, includes an opening that may be a complimentary shape to the head portion 3038. Referring now to FIG. 37, the cavity 3014 comprises two elongate portions, an outer portion 3075 and an inner portion 3077. The outer portion 3075 may be an extruded shape corresponding to the eye-shaped profile the enlarged head portion 3038. The inner portion 3077 may be cylindrical in shape. The diameter of the cylindrical inner portion 3077 may correspond to the widest portion of the eye-shaped profile of the outer portion 3075. As such, an intersection of the inner and outer portion 3077, 3075 in mill liner 10' forms two re-entrant portions 3031. The two re-entrant 3031 portions are correspondingly shaped to engage with the protrusions 3039 of enlarged head 3038. Corresponding abutment surfaces 3009, 3007 are formed on the protrusions 3039 and a shoulder defining the re-entrant portions 3031 and are configured to engage in a locked arrangement.

Referring to FIG. 35*b*, each coupling tool may have two footing projections 3098 configured to support the mill liner tool against the mill liner during coupling and removal. The footing projections 3098 are mounted to plate 3042 and extending therebelow. The footing projections 3098 may comprise an adjustable mounting portion 3100 at a first end, a footing portion 3102 at an opposing second end, and a footing stem 3104 extending therebetween. The footing stem 3104 may be cylindrical and may be integrally formed with the footing portion 3102.

The footing portion 3102 of footing projections 3098 comprises two footing protrusions 3106 extending laterally from two opposing sides of footing stem 3104. In the embodiment shown in FIGS. 35*a* and 35*b*, the footing portion 3102 may have a generally rectangular-prismed shape forming a T-shape with the footing stem 3104.

The adjustable mounting portion 3100 may include an array of notches 3108 along the length of the stem 3104. The notches may take the form of raised bumps, or depressions in the surface of stem 3104. The notches 3108 may selectively-engage at discrete positions about a corresponding footing mounting portion (not shown) disposed on plate 3042. The footing mounting portion may comprise complimentary notches to engage with notches 3108 of the footing projections 3098. The footing projections 3098 can be configured to selectively extend or retract from the plate 3042. Further, the footing projections 3098 can be extended or retracted independently of each other, such that one footing may extend further than the other footing. Advantageously, extending the footing projections 3098 independently can allow each footing to engage with differently contoured surfaces of the mill liner 10'.

In some forms, the footing projections 3098 can be extended and retracted manually. In other forms, electronic actuation can be utilised to either remotely control the position of the footing projections, or automatically adjust their position without the control of an operator.

The coupling tool 3016, in-use, is positioned above the cavity 3014. The two footing projections 3098 may be brought into contact with a surface of the mill liner 10'. The actuated projection 3018 may be aligned with and guided through the cavity 3014, in a direction from the outer portion 3075 toward the inner portion 3077. The protrusions 3039 are designed to be guided through the outer portion 3075 by the corresponding internal surfaces. In-use, the actuation mechanism 3096 may be fitted with electronic sensors to detect contact between the enlarged head 3038 and outer portion 3075. These electronic sensors may remotely relay the relative position of the enlarged head 3038 with respect to the outer and inner portions 3075, 3077. When the enlarged head enters the inner portion 3077, the actuated projection 3018 can be rotated relative to the coupling tool 3016 by operation of the actuator mechanism 3096. The actuated projection 3018 can be rotated through ninety-degrees to align the protrusions 3039 with complimentary re-entrant portions 3031. The protrusions 3039 are then positioned to engage behind the re-entrant portion 3031 in a locked arrangement.

Figure 38:
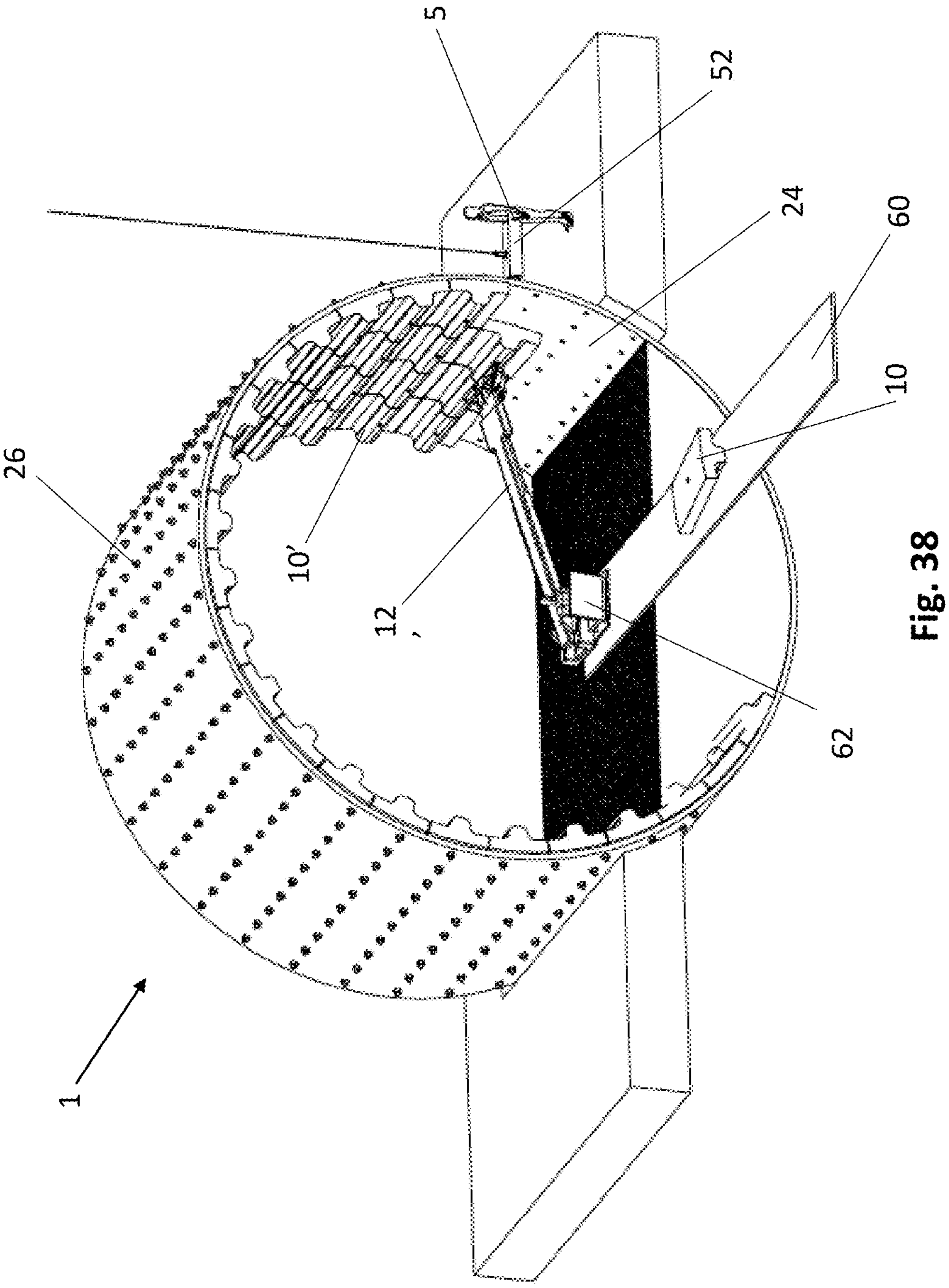
FIG. 38 is a perspective view of a further embodiment of a step of a method of replacing a mill liner from a grinding mill.

Disclosed in FIG. 38 is a further embodiment of a method of replacement of the mill liner 10' described above from the grinding mill 1. The further embodiments of the coupling tool (disclosed in FIGS. 22 to 28 and 35 to 37) may be releasably mounted to the mill liner replacement machine 12'. The primary difference between the first embodiment of a method of replacing the mill liner 10 (FIGS. 6 to 7) and the further embodiment is the operator 5 is not required to us the liner removal tool 52 to extend through the hole of the grinding mill wall 1 and knock-in the mill liner 10'.

In-use, the further embodiments of the coupling tool may require the operator 5 to release the fixing arrangement 26 as previously described, enabling the mill liner replacement machine 12' to remove the mill liners 10' from the grinding mill 1. The mill liner replacement machine 12' lifts each mill liner 10' and places it on a conveyer 60.

Any features or functions disclosed in relation to any of the embodiments may apply to the other embodiments. There are many variations that are within the ambit of the disclosure not expressly discussed herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A mill liner for a grinding mill comprising:

a wear surface and an opposite inner surface, and a fixing arrangement for use in mounting the mill liner to an interior surface of the grinding mill, wherein in use the mill liner is arranged to be removably mounted to the interior surface via the fixing arrangement extending along a longitudinal axis with the inner surface in opposed relation to the interior surface, wherein the mill liner further comprises a coupling component that forms part of a coupling to connect the mill liner to a coupling tool when used for lifting of the mill liner, the coupling component being accessible to the coupling tool via the inner surface or the wear surface, wherein the coupling component is separate from and laterally spaced apart from the fixing arrangement.

2. The mill liner of claim 1, wherein the coupling component comprises at least one cavity formed in the mill liner, and the at least one cavity opens to the inner surface.

3. The mill liner of claim 2, wherein the at least one cavity is shaped to capture a complementary projection disposed on the coupling tool.

4. The mill liner of claim 1, wherein the coupling component is spaced from the centre of gravity of the mill liner such that on the lifting of the mill liner through the coupling component, the mill liner is biased to move to a position under gravity that locks the coupling of the coupling tool to the mill liner.

5. A mill liner for a grinding mill comprising:

a wear surface and an opposite inner surface, and a fixing arrangement for use in mounting the mill liner to an interior surface of the grinding mill wherein in use the mill liner is arranged to be removably mounted to the interior surface via the fixing arrangement extending along a longitudinal axis with the inner surface in opposed relation to the interior surface, wherein the mill liner further comprises a coupling component that forms part of a coupling to connect the mill liner to a coupling tool when used for lifting of the mill liner, the coupling component comprising at least one cavity directly formed in the mill liner and being accessible to the coupling tool, wherein the coupling component is separate from and laterally spaced apart from the fixing arrangement.

6. The mill liner of claim 5, wherein the at least one cavity being accessible via the wear surface.

7. The mill liner of claim 5, wherein the at least one cavity opens to the wear surface.

8. The mill liner of claim 5, wherein the at least one cavity extends between the wear surface and the inner surface.

9. The mill liner of claim 5, wherein the at least one cavity is shaped to capture a complementary projection disposed on the coupling tool.

10. The mill liner of claim 5, wherein the coupling component is spaced from the centre of gravity of the mill liner such that on the lifting of the mill liner through the coupling component, the mill liner is biased to move to a position under gravity that locks the coupling of the coupling tool to the mill liner.

11. The mill liner of claim 5, wherein the fixing arrangement comprises at least one through hole to receive mechanical fasteners to secure the mill liner to the interior surface of the grinding mill.

12. The mill liner of claim 5, further comprises one or more plugs configured to inhibit the ingress of mill fines into the coupling component.

13. The mill liner of claim 12, wherein the coupling component is in the form of the at least one cavity and the one or more plugs are disposed within the at least one cavity.

14. The mill liner of claim 13, wherein the one or more plugs are arranged to allow the at least one cavity to become accessible on a wear of the wear surface.

15. The mill liner of claim 5, wherein at least a portion of the at least one cavity extends in the direction of the longitudinal axis.

16. A method for removal of a mill liner from a grinding mill, the mill liner comprising a wear surface and an opposite inner surface, a fixing arrangement for use in mounting the mill liner is arranged to be removably mounted to an interior surface of the grinding mill via the fixing arrangement extending along a longitudinal axis with the inner surface of the mill liner in opposed relation with the interior surface, the method comprising: removing of the mill liner from the interior surface of the grinding mill; and coupling a coupling tool used for lifting the mill liner to at least one cavity directly formed in the mill liner via the wear surface or the inner surface wherein the at least one cavity is separate from and laterally spaced apart from the fixing arrangement.

17. The method of claim 16, wherein the at least one cavity opens to the wear surface.

18. The method of claim 17, wherein the coupling tool comprises at least one projection that is a complementary shape to the at least one cavity and the method further comprises capturing the projection in the at least one cavity during the coupling of the coupling tool to the at least one cavity directly formed in the mill liner.

19. The method of claim 16, wherein a coupling component is spaced from the centre of gravity of the mill liner, and the method further comprises the lifting of the mill liner through the coupling component biases the mill liner to move to a position under gravity that locks the coupling of the coupling tool to the mill liner.

20. The method of claim 16, wherein the removing of the mill liner from the interior surface of the grinding mill is performed subsequent to the coupling the coupling tool to the at least one cavity directly formed in the mill liner.

21. The method of claim 20, further comprising removing the fixing arrangement to enable the removing of the mill liner and the lifting of the mill liner from the interior surface of the grinding mill by the coupled coupling tool to the at least one cavity directly formed in the mill liner.

22. The method of claim 16, wherein at least a portion of the at least one cavity extends in the direction of the longitudinal axis.

* * * * *